United States Patent
Shih

(10) Patent No.: US 10,914,927 B2
(45) Date of Patent: Feb. 9, 2021

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventor: Po-Yuan Shih, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 200 days.

(21) Appl. No.: 16/159,756

(22) Filed: Oct. 15, 2018

(65) Prior Publication Data

US 2019/0219798 A1  Jul. 18, 2019

(30) Foreign Application Priority Data

Jan. 18, 2018 (CN) ............. 2018 1 0048247

(51) Int. Cl.
- *G02B 13/06* (2006.01)
- *G02B 27/00* (2006.01)
- *G02B 9/62* (2006.01)
- *G02B 13/00* (2006.01)
- *G02B 13/04* (2006.01)

(52) U.S. Cl.
CPC ............. *G02B 13/06* (2013.01); *G02B 9/62* (2013.01); *G02B 13/0045* (2013.01); *G02B 13/04* (2013.01); *G02B 27/0037* (2013.01)

(58) Field of Classification Search
CPC .... G02B 13/06; G02B 13/0045; G02B 13/04; G02B 27/0037; G02B 9/62; G02B 13/18; H04N 5/23238; H04N 5/2254; G03B 37/00; G03B 37/04

USPC ......................................................... 359/725
See application file for complete search history.

(56) References Cited

U.S. PATENT DOCUMENTS

| | | | |
|---|---|---|---|
| 4,747,676 A * | 5/1988 | Hirakawa | G02B 13/04 359/751 |
| 9,176,300 B2 | 11/2015 | Chen et al. | |
| 10,131,278 B2 * | 11/2018 | Nagano | B60R 1/00 |
| 10,203,477 B2 | 2/2019 | Dai | |
| 10,234,654 B2 * | 3/2019 | Chiu | G02B 13/06 |
| 2010/0084785 A1 | 4/2010 | Masuhara et al. | |
| 2014/0198395 A1 * | 7/2014 | Ryu | G02B 9/60 359/713 |

(Continued)

FOREIGN PATENT DOCUMENTS

| CN | 104950423 A | 9/2015 |
|---|---|---|
| CN | 106646835 A | 5/2017 |

(Continued)

*Primary Examiner* — Mohammed A Hasan
(74) *Attorney, Agent, or Firm* — McClure, Qualey & Rodack, LLP.

(57) ABSTRACT

A wide-angle lens assembly comprises sequentially from an object side to an image side along an optical axis a first lens, a second lens, a third lens, a fourth lens, a fifth lens, and a sixth lens. The first lens is a meniscus lens with negative refractive power. The second lens is a meniscus lens with positive refractive power. The third lens is a biconvex lens with positive refractive power. The fourth lens is with refractive power and includes a convex surface facing an object side. The fifth lens is with refractive power and includes a concave surface facing an image side. The sixth lens is with negative refractive power and includes a concave surface facing the object side.

19 Claims, 16 Drawing Sheets

(56) References Cited

U.S. PATENT DOCUMENTS

2014/0247507 A1   9/2014   Tsai et al.

FOREIGN PATENT DOCUMENTS

| CN | 107290840 | A | 10/2017 |
| JP | 2008058845 | A | 3/2008 |
| JP | 2008257108 | A | 5/2010 |
| JP | 6197141 | A | 1/2019 |

* cited by examiner

WIDE-ANGLE LENS ASSEMBLY

CROSS REFERENCE TO RELATED APPLICATIONS

This Application claims priority of China Patent Application No. 201810048247.9, filed on Jan. 18, 2018, the entirety of which is incorporated by reference herein.

BACKGROUND OF THE INVENTION

Field of the Invention

The invention relates to a wide-angle lens assembly.

Description of the Related Art

The current development trend of a wide-angle lens assembly is toward miniaturization, large field of view, and high resolution. Additionally, the wide-angle lens assembly is developed to have resistance to environment temperature variation in accordance with different application requirements. However, the known wide-angle lens assembly can't satisfy such requirements. Therefore, the wide-angle lens assembly needs a new structure in order to meet the requirements of miniaturization, large field of view, high resolution, and resistance to environment temperature variation at the same time.

BRIEF SUMMARY OF THE INVENTION

The invention provides a wide-angle lens assembly to solve the above problems. The wide-angle lens assembly of the invention is provided with characteristics of a shortened total lens length, a larger field of view, a higher resolution, a resistance to environment temperature variation, and still has a good optical performance.

The wide-angle lens assembly in accordance with an exemplary embodiment of the invention includes a first lens, a second lens, a third lens, a fourth lens, a fifth lens, and a sixth lens. The first lens is a meniscus lens with negative refractive power. The second lens is a meniscus lens with positive refractive power. The third lens is a biconvex lens with positive refractive power. The fourth lens is with refractive power and includes a convex surface facing an object side. The fifth lens is with refractive power and includes a concave surface facing an image side. The sixth lens is with negative refractive power and includes a concave surface facing the object side. The first lens, the second lens, the third lens, the fourth lens, the fifth lens, and the sixth lens are arranged in order from the object side to the image side along an optical axis.

In another exemplary embodiment, the wide-angle lens assembly further includes a stop disposed between the second lens and the third lens, wherein the fourth lens and the fifth lens are cemented.

In yet another exemplary embodiment, the wide-angle lens assembly satisfies: $0.2 \leq f/TTL \leq 1$, wherein f is an effective focal length of the wide-angle lens assembly and TTL is an interval from an object side surface of the first lens to an image plane along the optical axis.

In another exemplary embodiment, the fourth lens is with positive refractive power and further includes a convex surface facing the image side and the fifth lens is with negative refractive power and further includes a concave surface facing the object side.

In yet another exemplary embodiment, the fourth lens is with negative refractive power and further includes a concave surface facing the image side and the fifth lens is with positive refractive power and further includes a convex surface facing the object side.

In another exemplary embodiment, the wide-angle lens assembly satisfies: $4 < R_{11}/R_{12} \leq 100$, wherein $R_{11}$ is a radius of curvature of an object side surface of the first lens and $R_{12}$ is a radius of curvature of an image side surface of the first lens.

In yet another exemplary embodiment, the wide-angle lens assembly satisfies: $-100 \leq R_{61}/R_{62} < 0.1$, wherein $R_{61}$ is a radius of curvature of the concave surface of the sixth lens and $R_{62}$ is a radius of curvature of an image side surface of the sixth lens.

In another exemplary embodiment, the wide-angle lens assembly satisfies: $10 \leq Vd_1/Nd_1 \leq 32$, wherein $Vd_1$ is an Abbe number of the first lens and $Nd_1$ is an index of refraction of the first lens.

In yet another exemplary embodiment, the sixth lens further includes a convex surface facing the image side or a concave surface facing the image side.

In another exemplary embodiment, the wide-angle lens assembly satisfies: $-70 < ((R_{31}-R_{32})/(R_{31}+R_{32})) \times ((R_{41}-R_{42})/(R_{41}+R_{42})) \times ((R_{51}-R_{52})/(R_{51}+R_{52})) \times ((R_{61}-R_{62})/(R_{61}+R_{62})) \leq -2.8$, $1 \leq f_3/f \leq 2$, wherein $f_3$ is an effective focal length of the third lens, f is an effective focal length of the wide-angle lens assembly, $R_{31}$ is a radius of curvature of an object side surface of the third lens, $R_{32}$ is a radius of curvature of an image side surface of the third lens, $R_{41}$ is a radius of curvature of the convex surface of the fourth lens, $R_{42}$ is a radius of curvature of an image side surface of the fourth lens, $R_{51}$ is a radius of curvature of an object side surface of the fifth lens, $R_{52}$ is a radius of curvature of the concave surface of the fifth lens, $R_{61}$ is a radius of curvature of the concave surface of the sixth lens, and $R_{62}$ is a radius of curvature of an image side surface of the sixth lens.

In yet another exemplary embodiment, the wide-angle lens assembly satisfies: $1 \leq f_3/f \leq 2$, wherein $f_3$ is an effective focal length of the third lens and f is an effective focal length of the wide-angle lens assembly.

In another exemplary embodiment, the first lens further includes a convex surface facing the object side and a concave surface facing the image side.

In yet another exemplary embodiment, the second lens further includes a convex surface facing the object side and a concave surface facing the image side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
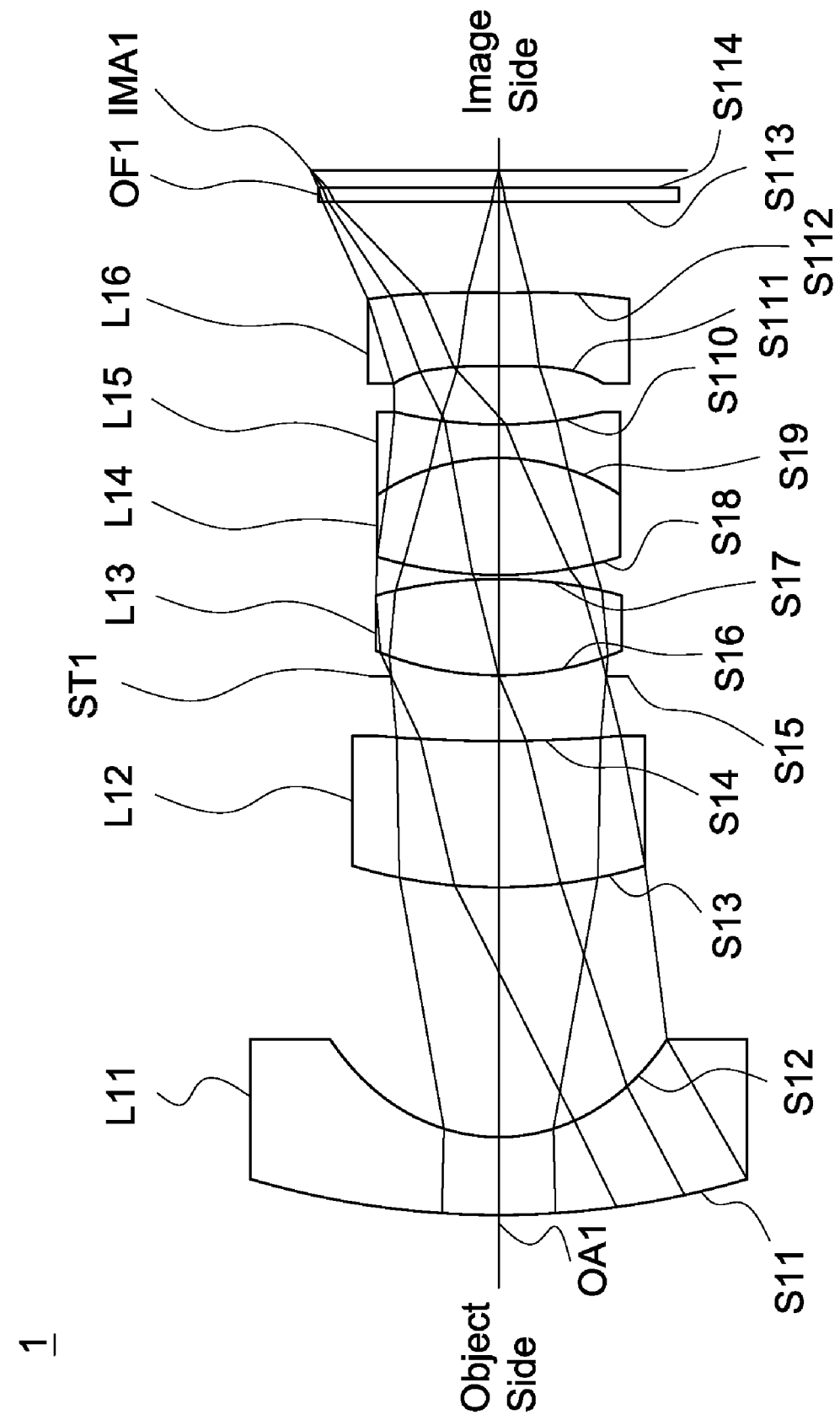
FIG. 1 is a lens layout and optical path diagram of a wide-angle lens assembly in accordance with a first embodiment of the invention.

Referring to FIG. 1, FIG. 1 is a lens layout and optical path diagram of a wide-angle lens assembly in accordance with a first embodiment of the invention. The wide-angle lens assembly 1 includes a first lens L11, a second lens L12, a stop ST1, a third lens L13, a fourth lens L14, a fifth lens L15, a sixth lens L16, and an optical filter OF1, all of which are arranged in order from an object side to an image side along an optical axis OA1. In operation, an image of light rays from the object side is formed at an image plane IMA1.

The first lens L11 is a meniscus lens with negative refractive power and made of glass material, wherein the object side surface S11 is a convex surface, the image side surface S12 is a concave surface, and both of the object side surface S11 and image side surface S12 are aspheric surfaces.

The second lens L12 is a meniscus lens with positive refractive power and made of glass material, wherein the object side surface S13 is a convex surface, the image side surface S14 is a concave surface, and both of the object side surface S13 and image side surface S14 are aspheric surfaces.

The third lens L13 is a biconvex lens with positive refractive power and made of glass material, wherein the object side surface S16 is a convex surface, the image side surface S17 is a convex surface, and both of the object side surface S16 and image side surface S17 are spherical surfaces.

The fourth lens L14 is a biconvex lens with positive refractive power and made of glass material, wherein the object side surface S18 is a convex surface, the image side surface S19 is a convex surface, and both of the object side surface S18 and image side surface S19 are spherical surfaces.

The fifth lens L15 is a biconcave lens with negative refractive power and made of glass material, wherein the object side surface S19 is a concave surface, the image side surface S110 is a concave surface, and both of the object side surface S19 and image side surface S110 are spherical surfaces.

The fourth lens L14 and the fifth lens L15 are cemented.

The sixth lens L16 is a biconcave lens with negative refractive power and made of glass material, wherein the object side surface S111 is a concave surface, the image side surface S112 is a concave surface, and both of the object side surface S111 and image side surface S112 are aspheric surfaces.

Both of the object side surface S113 and image side surface S114 of the optical filter OF1 are plane surfaces.

In order to maintain excellent optical performance of the wide-angle lens assembly in accordance with the first embodiment of the invention, the wide-angle lens assembly 1 satisfies at least one of the following conditions:

$$-70 \leq ((R1_{31}-R1_{32})(R1_{31}+R1_{32})) \times ((R1_{41}-R1_{42})/(R1_{41}+R1_{42})) \times ((R1_{51}-R1_{52})/(R1_{51}+R1_{52})) \times ((R1_{61}-R1_{62})/(R1_{61}+R1_{62})) \leq -2.8 \quad (1)$$

$$4 < R1_{11}/R1_{12} \leq 100 \quad (2)$$

$$-100 \leq R1_{61}/R1_{62} \leq 0.1 \quad (3)$$

$$10 \leq Vd1_1/Nd1_1 \leq 32 \quad (4)$$

$$0.2 \leq f1/TTL1 \leq 1 \quad (5)$$

$$1 \leq f1_3/f1 \leq 2 \quad (6)$$

wherein $R1_{11}$ is a radius of curvature of the object side surface S11 of the first lens L11, $R1_{12}$ is a radius of curvature of the image side surface S12 of the first lens L11, $R1_{31}$ is a radius of curvature of the object side surface S16 of the third lens L13, $R1_{32}$ is a radius of curvature of the image side surface S17 of the third lens L13, $R1_{41}$ is a radius of curvature of the object side surface S18 of the fourth lens L14, $R1_{42}$ is a radius of curvature of the image side surface S19 of the fourth lens L14, $R1_{51}$ is a radius of curvature of the object side surface S19 of the fifth lens L15, $R1_{52}$ is a radius of curvature of the image side surface S110 of the fifth lens L15, $R1_{61}$ is a radius of curvature of the object side surface S111 of the sixth lens L16, $R1_{62}$ is a radius of curvature of the image side surface S112 of the sixth lens L16, $Vd1_1$ is an Abbe number of the first lens L11, $Nd1_1$ is an index of refraction of the first lens L11, f1 is an effective focal length of the wide-angle lens assembly 1, $f1_3$ is an effective focal length of the third lens L13, and TTL1 is an interval from the object side surface S11 of the first lens L11 to the image plane IMA1 along the optical axis OA1.

By the above design of the lenses, stop ST1, and satisfies at least one of the conditions (1)-(6), the wide-angle lens assembly 1 is provided with an effective shortened total lens length, an effective increased field of view, an effective increased resolution, an effective corrected aberration, and a resistance to environment temperature variation.

If the value f1/TTL1 of condition (5) is greater than 1 then the purpose of expanding the field of view is difficult to achieve. Therefore, the value f1/TTL1 must be at least less than 1. An optimal range for f1/TTL1 is from 0.2 to 1. The lens assembly 1 has the optimal condition for widening the field of view when satisfies the condition: $0.2 \leq f1/TTL1 \leq 1$.

In order to achieve the above purposes and effectively enhance the optical performance, the wide-angle lens assembly 1 in accordance with the first embodiment of the invention is provided with the optical specifications shown in Table 1, which include the effective focal length, F-number, total lens length, field of view, radius of curvature of each lens surface, thickness between adjacent surface, refractive index of each lens, and Abbe number of each lens. Table 1 shows that the effective focal length is equal to 5.078 mm, F-number is equal to 2.0, total lens length is equal to 22.000 mm, and field of view is equal to 75.000 degrees for the wide-angle lens assembly 1 of the first embodiment of the invention.

TABLE 1

Effective Focal Length = 5.078 mm F-number = 2.0
Total Lens Length = 22.000 mm Field of View = 75.000 Degrees

| Surface Number | Radius of Curvature (mm) | Thickness (mm) | Nd | Vd | Remark |
|---|---|---|---|---|---|
| S11 | 19.505 | 1.638 | 1.732 | 53.0 | The First Lens L11 |
| S12 | 3.697 | 5.275 | | | |

TABLE 1-continued

Effective Focal Length = 5.078 mm F-number = 2.0
Total Lens Length = 22.000 mm Field of View = 75.000 Degrees

| Surface Number | Radius of Curvature (mm) | Thickness (mm) | Nd | Vd | Remark |
|---|---|---|---|---|---|
| S13 | 10.299 | 3.070 | 1.656 | 40.3 | The Second Lens L12 |
| S14 | 31.060 | 1.370 | | | |
| S15 | ∞ | 0.000 | | | Stop ST1 |
| S16 | 5.908 | 2.036 | 1.613 | 60.6 | The Third Lens L13 |
| S17 | −10.386 | 0.100 | | | |
| S18 | 9.132 | 2.459 | 1.700 | 56.2 | The Fourth Lens L14 |
| S19 | −4.604 | 0.700 | 1.834 | 25.1 | The Fifth Lens L15 |
| S110 | 9.104 | 1.234 | | | |
| S111 | −28.368 | 1.537 | 1.825 | 26.2 | The Sixth Lens L16 |
| S112 | 100.814 | 1.917 | | | |
| S113 | ∞ | 0.300 | 1.517 | 64.2 | Optical Filter OF1 |
| S114 | ∞ | 0.364 | | | |

The aspheric surface sag z of each lens in table 1 can be calculated by the following formula:

$$z = ch^2 / \{1 + [1-(k+1)c^2h^2]^{1/2}\} + Ah^4 + Bh^6 + Ch^8$$

where c is curvature, h is the vertical distance from the lens surface to the optical axis, k is conic constant and A, B and C are aspheric coefficients.

In the first embodiment, the conic constant k and the aspheric coefficients A, B, C of each surface are shown in Table 2.

TABLE 2

| | Surface Number | | | | | |
|---|---|---|---|---|---|---|
| | S11 | S12 | S13 | S14 | S111 | S112 |
| K | −2.2085E+01 | −5.4018E−01 | 2.6184E+00 | 0.0000E+00 | 0.0000E+00 | 0.0000E+00 |
| A | 2.9785E−04 | 2.9145E−04 | −8.8986E−04 | 1.0193E−04 | −9.8563E−03 | −4.2159E−03 |
| B | −1.0680E−06 | 3.1976E−05 | −1.5893E−06 | 2.7804E−05 | −3.5124E−04 | 5.6780E−05 |
| C | −2.9125E−08 | 2.4586E−06 | −7.8911E−08 | 1.9801E−06 | −3.5925E−05 | 1.3356E−05 |

Table 3 shows the parameters and condition values for conditions (1)-(6). As can be seen from Table 3, the wide-angle lens assembly 1 of the first embodiment satisfies the conditions (1)-(6).

TABLE 3

| | | | | | |
|---|---|---|---|---|---|
| $R1_{11}$ | 19.5048 mm | $R1_{12}$ | 3.6969 mm | $R1_{31}$ | 5.9083 mm |
| $R1_{32}$ | −10.3860 mm | $R1_{41}$ | 9.1320 mm | $R1_{42}$ | −4.6042 mm |
| $R1_{51}$ | −4.6042 mm | $R1_{52}$ | 9.1040 mm | $R1_{61}$ | −28.3685 mm |
| $R1_{62}$ | 100.8139 mm | $Vd1_1$ | 53.0 | $Nd1_1$ | 1.732 |
| f1 | 5.078 mm | $f1_3$ | 6.4308 mm | TTL1 | 22.000 mm |
| $(R1_{31} - R1_{32})/(R1_{31} + R1_{32}) \times (R1_{41} - R1_{42})/(R1_{41} + R1_{42}) \times$ $(R1_{51} - R1_{52})/(R1_{51} + R1_{52}) \times (R1_{61} - R1_{62})/(R1_{61} + R1_{62})$ | | | | | −59.9702 |
| $R1_{11}/R1_{12}$ | 5.276 | $R1_{61}/R1_{62}$ | −0.281 | $Vd1_1/Nd1_1$ | 30.608 |
| f1/TTL1 | 0.231 | $f1_3/f1$ | 1.266 | | |

Figure 2A:
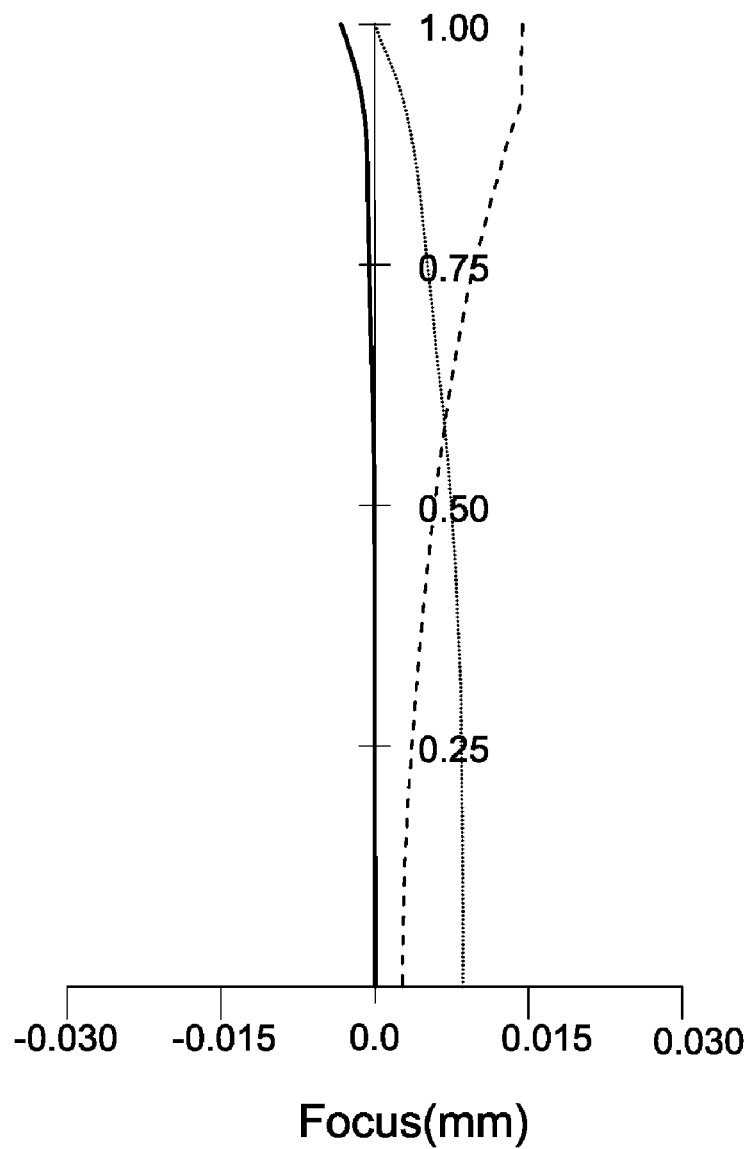
FIG. 2A depicts a longitudinal spherical aberration of the wide-angle lens assembly in accordance with the first embodiment of the invention.
Figure 2B:
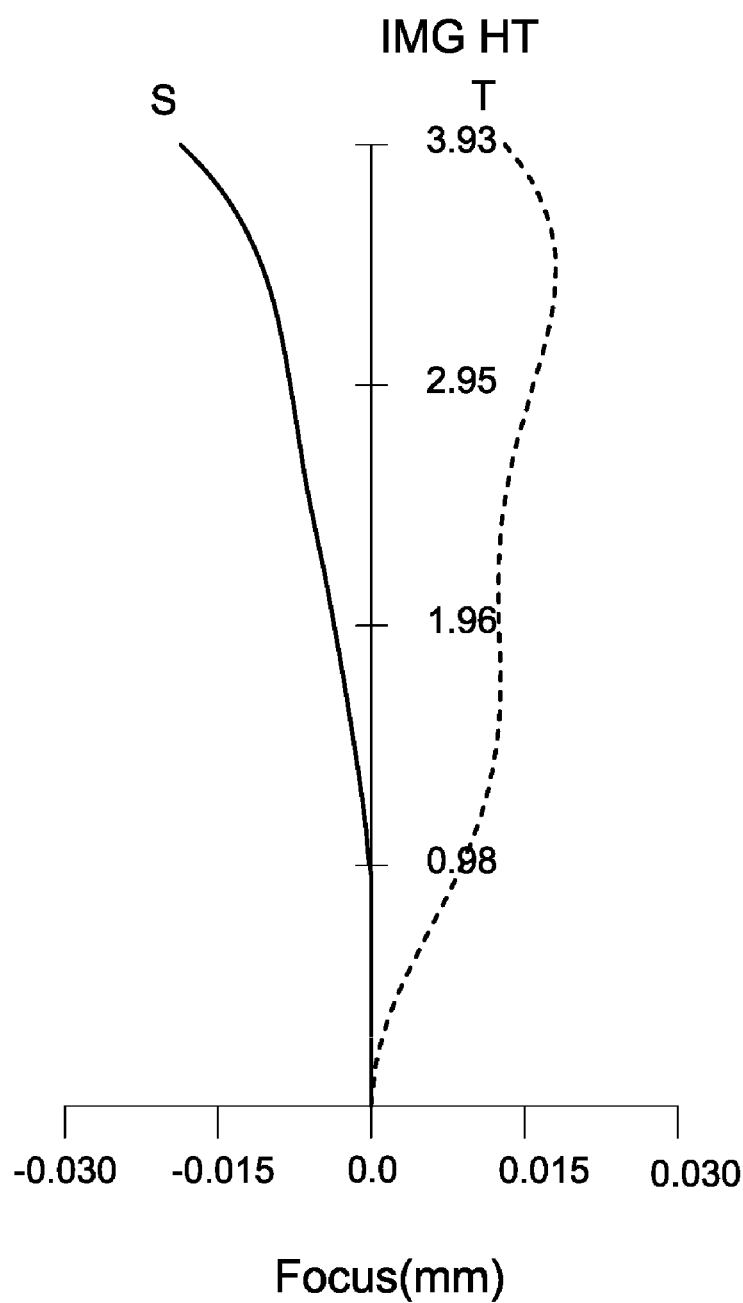
FIG. 2B is an astigmatic field curves diagram of the wide-angle lens assembly in accordance with the first embodiment of the invention.
Figure 2C:
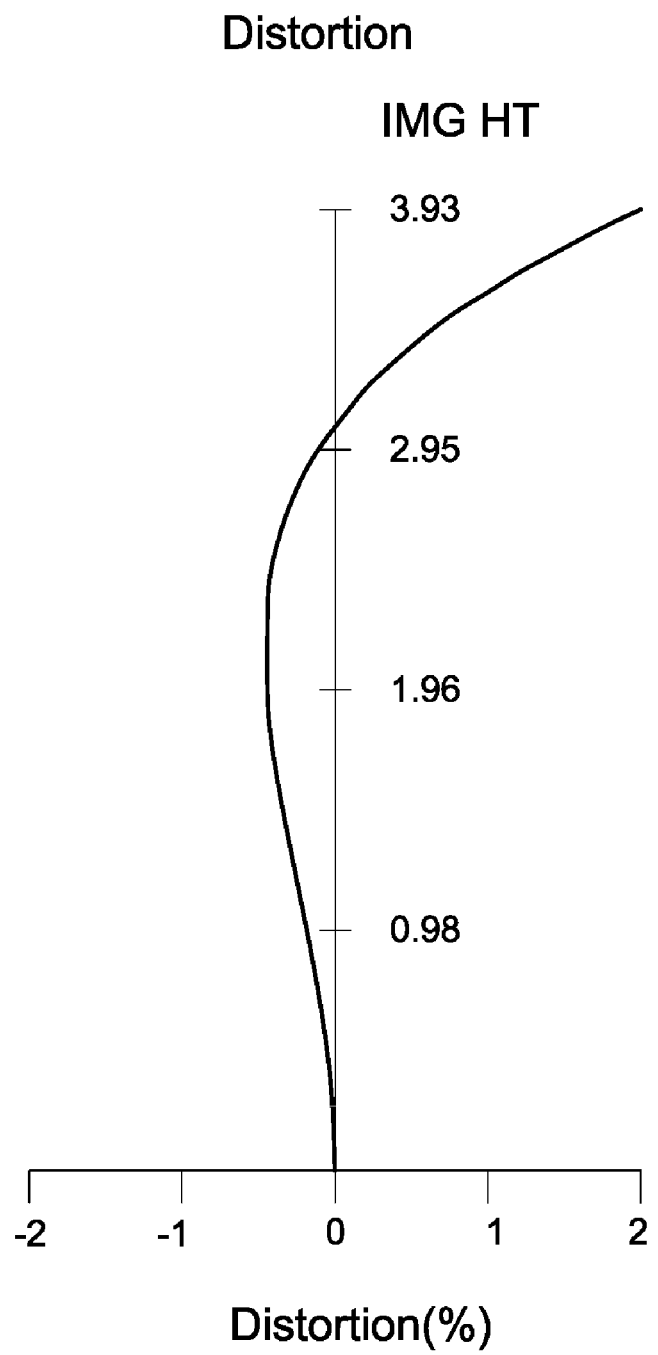
FIG. 2C is a distortion diagram of the wide-angle lens assembly in accordance with the first embodiment of the invention.

By the above arrangements of the lenses and stop ST1, the wide-angle lens assembly 1 of the first embodiment can meet the requirements of optical performance as seen in FIGS. 2A-2C, wherein FIG. 2A shows a longitudinal spherical aberration diagram of the wide-angle lens assembly 1 in accordance with the first embodiment of the invention, FIG. 2B shows an astigmatic field curves diagram of the wide-angle lens assembly 1 in accordance with the first embodiment of the invention, and FIG. 2C shows a distortion diagram of the wide-angle lens assembly 1 in accordance with the first embodiment of the invention.

It can be seen from FIG. 2A that the longitudinal spherical aberration in the wide-angle lens assembly 1 of the first embodiment ranges from −0.015 mm to 0.015 mm for the wavelength of 470.0000 nm, 555.0000 nm, and 650.0000 nm.

It can be seen from FIG. 2B that the astigmatic field curves of tangential direction and sagittal direction in the wide-angle lens assembly 1 of the first embodiment ranges from −0.030 mm to 0.030 mm for the wavelength of 555.0000 nm.

It can be seen from FIG. 2C that the distortion in the wide-angle lens assembly 1 of the first embodiment ranges from −1.0% to 2.0% for the wavelength of 555.0000 nm.

It is obvious that the longitudinal spherical aberration, the astigmatic field curves, and the distortion of the wide-angle lens assembly 1 of the first embodiment can be corrected effectively. Therefore, the wide-angle lens assembly 1 of the first embodiment is capable of good optical performance.

Figure 3:
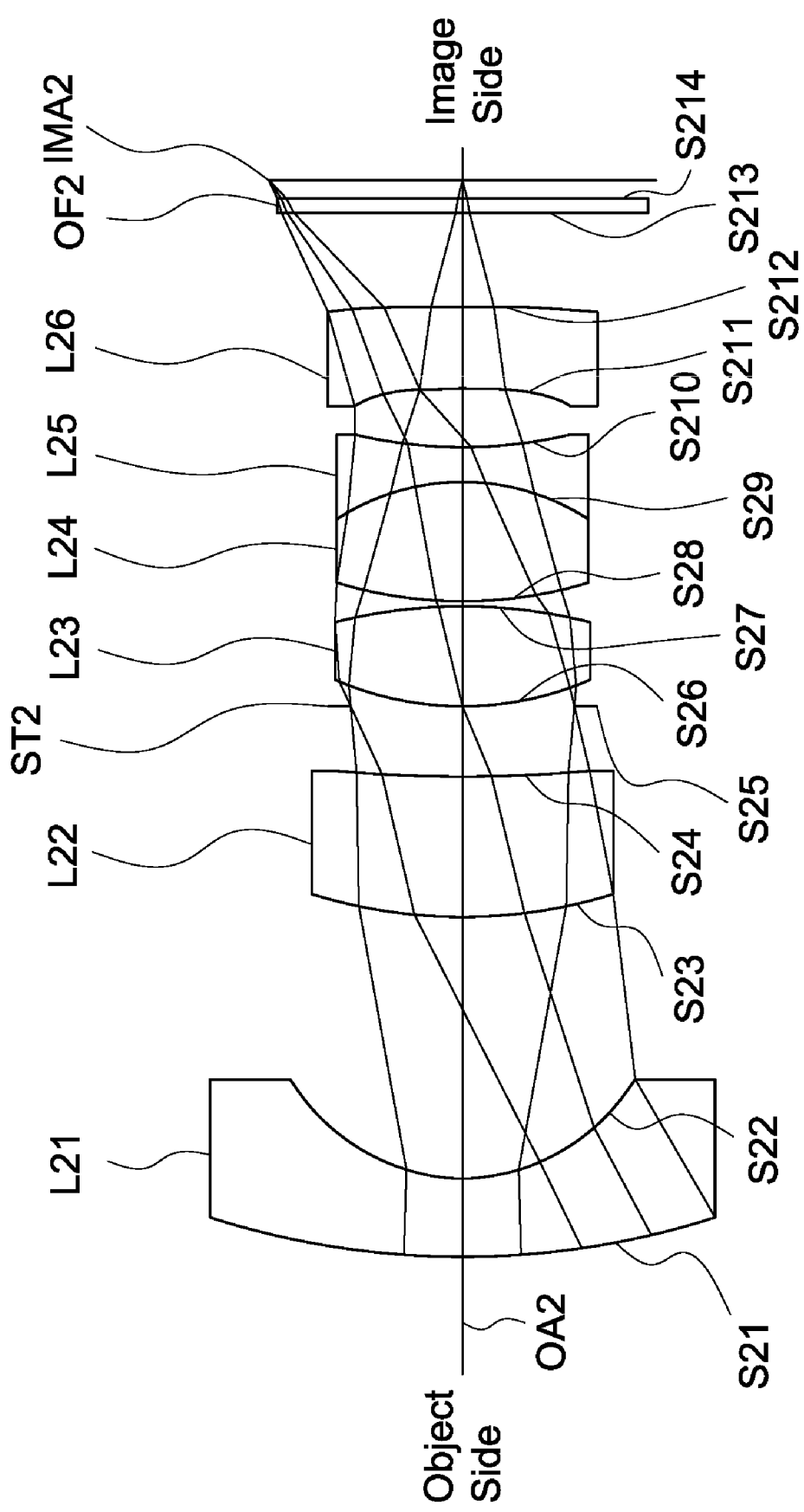
FIG. 3 is a lens layout and optical path diagram of a wide-angle lens assembly in accordance with a second embodiment of the invention.

Referring to FIG. 3, FIG. 3 is a lens layout and optical path diagram of a wide-angle lens assembly in accordance with a second embodiment of the invention. The wide-angle lens assembly 2 includes a first lens L21, a second lens L22, a stop ST2, a third lens L23, a fourth lens L24, a fifth lens L25, a sixth lens L26, and an optical filter OF2, all of which are arranged in order from an object side to an image side along an optical axis OA2. In operation, an image of light rays from the object side is formed at an image plane IMA2.

The first lens L21 is a meniscus lens with negative refractive power and made of glass material, wherein the object side surface S21 is a convex surface, the image side surface S22 is a concave surface, and both of the object side surface S21 and image side surface S22 are aspheric surfaces.

The second lens L22 is a meniscus lens with positive refractive power and made of glass material, wherein the object side surface S23 is a convex surface, the image side surface S24 is a concave surface, and both of the object side surface S23 and image side surface S24 are aspheric surfaces.

The third lens L23 is a biconvex lens with positive refractive power and made of glass material, wherein the object side surface S26 is a convex surface, the image side surface S27 is a convex surface, and both of the object side surface S26 and image side surface S27 are spherical surfaces.

The fourth lens L24 is a biconvex lens with positive refractive power and made of glass material, wherein the object side surface S28 is a convex surface, the image side surface S29 is a convex surface, and both of the object side surface S28 and image side surface S29 are spherical surfaces.

The fifth lens L25 is a biconcave lens with negative refractive power and made of glass material, wherein the object side surface S29 is a concave surface, the image side surface S210 is a concave surface, and both of the object side surface S29 and image side surface S210 are spherical surfaces.

The fourth lens L24 and the fifth lens L25 are cemented.

The sixth lens L26 is a biconcave lens with negative refractive power and made of glass material, wherein the object side surface S211 is a concave surface, the image side surface S212 is a concave surface, and both of the object side surface S211 and image side surface S212 are aspheric surfaces.

Both of the object side surface S213 and image side surface S214 of the optical filter OF2 are plane surfaces.

In order to maintain excellent optical performance of the wide-angle lens assembly in accordance with the second embodiment of the invention, the wide-angle lens assembly 2 satisfies at least one of the following conditions:

$$-70 \leq ((R2_{31}-R2_{32})/(R2_{31}+R2_{32}))\times((R2_{41}-R2_{42})/(R2_{41}+R2_{42}))\times((R2_{51}-R2_{52})/(R2_{51}+R2_{52}))\times((R2_{61}-R2_{62})/(R2_{61}+R2_{62})) \leq -2.8 \quad (7)$$

$$4 < R2_{11}/R2_{12} \leq 100 \quad (8)$$

$$-100 \leq R2_{61}/R2_{62} < 0.1 \quad (9)$$

$$10 \leq Vd2_1/Nd2_1 \leq 32 \quad (10)$$

$$0.2 \leq f2/TTL2 \leq 1 \quad (11)$$

$$1 \leq f2_3/f2 \leq 2 \quad (12)$$

The definition of $R2_{11}$, $R2_{12}$, $R2_{31}$, $R2_{32}$, $R2_{41}$, $R2_{42}$, $R2_{51}$, $R2_{52}$, $R2_{61}$, $R2_{62}$, $Vd2_1$, $Nd2_1$, $f2$, $f2_3$, and TTL2 are the same as that of $R1_{11}$, $R1_{12}$, $R1_{31}$, $R1_{32}$, $R1_{41}$, $R1_{42}$, $R1_{51}$, $R1_{52}$, $R1_{61}$, $R1_{62}$, $Vd1_1$, $Nd1_1$, $f1$, $f1_3$, and TTL1 in the first embodiment, and is not described here again.

By the above design of the lenses, stop ST2, and satisfies at least one of the conditions (7)-(12), the wide-angle lens assembly 2 is provided with an effective shortened total lens length, an effective increased field of view, an effective increased resolution, an effective corrected aberration, and a resistance to environment temperature variation.

If the value $f2_3/f2$ of condition (12) is less than 1 then the ability to correct the aberration for the third lens L23 is decreased and the shape of the third lens L23 cannot be controlled effectively. Therefore, the value $f2_3/f2$ must be at least greater than 1. An optimal range for $f2_3/f2$ is from 1 to 2. The lens assembly 2 accords with the optimal range, the shape of the third lens L23 can be controlled effectively, the strength of the refractive power of the third lens L23 can be restrained at the same time, and the ability for correcting the aberration of the third lens L23 can be strengthened.

In order to achieve the above purposes and effectively enhance the optical performance, the wide-angle lens assembly 2 in accordance with the second embodiment of the invention is provided with the optical specifications shown in Table 4, which include the effective focal length, F-number, total lens length, field of view, radius of curvature of each lens surface, thickness between adjacent surface, refractive index of each lens, and Abbe number of each lens. Table 4 shows that the effective focal length is equal to 4.785 mm, F-number is equal to 2.0, total lens length is equal to 22.000 mm, and field of view is equal to 77.387 degrees for the wide-angle lens assembly 2 of the second embodiment of the invention.

TABLE 4

Effective Focal Length = 4.785 mm F-number = 2.0
Total Lens Length = 22.000 mm Field of View = 77.387 Degrees

| Surface Number | Radius of Curvature (mm) | Thickness (mm) | Nd | Vd | Remark |
|---|---|---|---|---|---|
| S21 | 16.436 | 1.592 | 1.690 | 38.9 | The First Lens L21 |
| S22 | 3.749 | 5.352 | | | |
| S23 | 9.612 | 2.865 | 1.681 | 41.6 | The Second Lens L22 |
| S24 | 31.660 | 1.443 | | | |
| S25 | ∞ | 0.000 | | | Stop ST2 |
| S26 | 6.451 | 2.043 | 1.623 | 61.1 | The Third Lens L23 |
| S27 | −10.537 | 0.100 | | | |
| S28 | 8.646 | 2.460 | 1.711 | 56.3 | The Fourth Lens L24 |
| S29 | −4.580 | 0.700 | 1.823 | 25.1 | The Fifth Lens L25 |
| S210 | 9.480 | 1.198 | | | |
| S211 | −25.548 | 1.667 | 1.847 | 26.7 | The Sixth Lens L26 |
| S212 | 108.040 | 1.918 | | | |
| S213 | ∞ | 0.300 | 1.517 | 64.2 | Optical Filter OF2 |
| S214 | ∞ | 0.364 | | | |

The aspheric surface sag z of each lens in table 4 can be calculated by the following formula:

$$z = ch^2 / \{1 + [1-(k+1)c^2h^2]^{1/2}\} + Ah^4 + Bh^6 + Ch^8$$

where c is curvature, h is the vertical distance from the lens surface to the optical axis, k is conic constant and A, B and C are aspheric coefficients.

In the second embodiment, the conic constant k and the aspheric coefficients A, B, C of each surface are shown in Table 5.

TABLE 5

| | Surface Number | | | | | |
|---|---|---|---|---|---|---|
| | S21 | S22 | S23 | S24 | S211 | S212 |
| K | −2.7624E+01 | −5.1313E−01 | 2.6167E+00 | −3.4530E−01 | 3.6086E+00 | −3.1100E+00 |
| A | 2.1490E−04 | −5.0089E−03 | −6.8151E−04 | 2.3685E−04 | 1.0575E−03 | −2.8217E−03 |
| B | −2.1309E−06 | 2.5315E−04 | −3.6482E−04 | 2.3477E−05 | −1.1631E−03 | 1.6894E−04 |
| C | 5.3747E−09 | 1.5100E−06 | −1.8342E−07 | 2.0315E−06 | −1.1385E−05 | 2.8536E−05 |

Table 6 shows the parameters and condition values for conditions (7)-(12). As can be seen from Table 6, the wide-angle lens assembly 2 of the second embodiment satisfies the conditions (7)-(12).

TABLE 6

| | | | | | |
|---|---|---|---|---|---|
| $R2_{11}$ | 16.4356 mm | $R2_{12}$ | 3.7487 mm | $R2_{31}$ | 6.4509 mm |
| $R2_{32}$ | −10.5366 mm | $R2_{41}$ | 8.6460 mm | $R2_{42}$ | −4.5804 mm |
| $R2_{51}$ | −4.5804 mm | $R2_{52}$ | 9.4805 mm | $R2_{61}$ | −25.5485 mm |
| $R2_{62}$ | 108.0396 mm | $Vd2_1$ | 38.9 | $Nd2_1$ | 1.690 |
| f2 | 4.785 mm | $f2_3$ | 6.7131 mm | TTL2 | 22.000 mm |
| $(R2_{31} - R2_{32})/(R2_{31} + R2_{32}) \times (R2_{41} - R2_{42})/(R2_{41} + R2_{42}) \times$ | | | | | −62.8555 |
| $(R2_{51} - R2_{52})/(R2_{51} + R2_{52}) \times (R2_{61} - R2_{62})/(R2_{61} + R2_{62})$ | | | | | |
| $R2_{11}/R2_{12}$ | 4.384 | $R2_{61}/R2_{62}$ | −0.236 | $Vd2_1/Nd2_1$ | 23.004 |
| f2/TTL2 | 0.217 | $f2_3/f2$ | 1.403 | | |

Figure 4A:
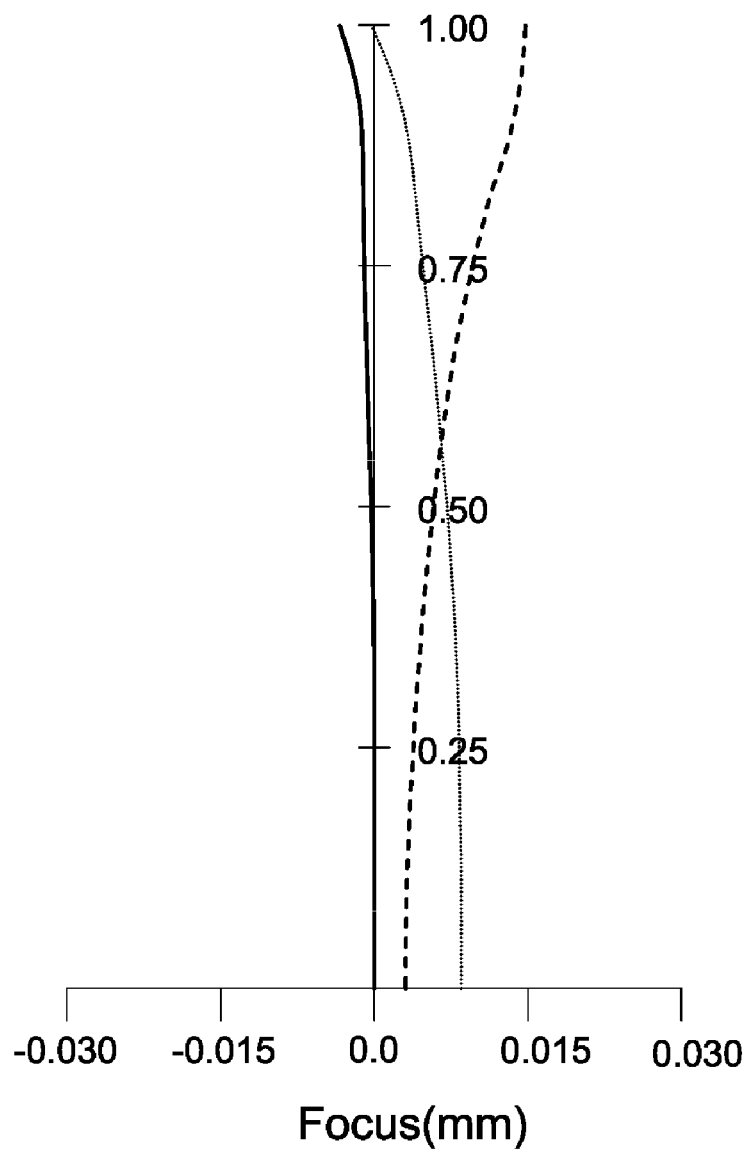
FIG. 4A depicts a longitudinal spherical aberration of the wide-angle lens assembly in accordance with the second embodiment of the invention.
Figure 4B:
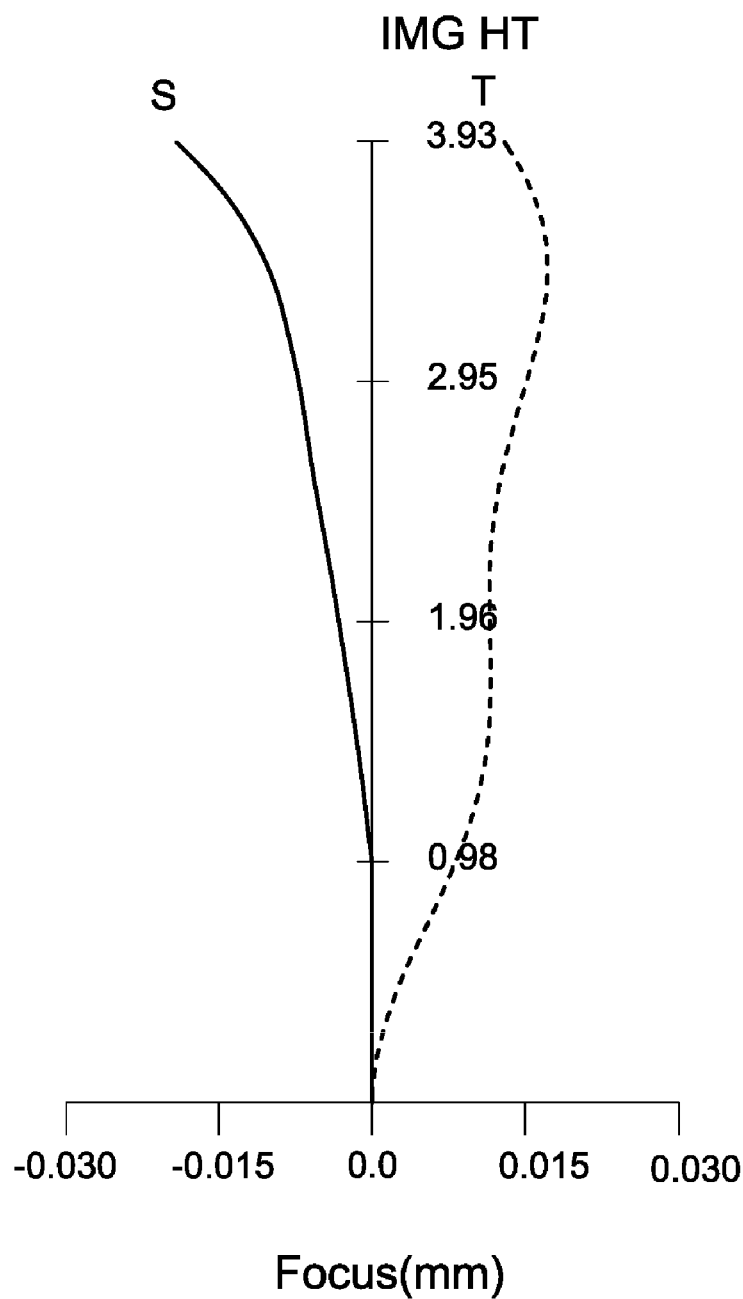
FIG. 4B is an astigmatic field curves diagram of the wide-angle lens assembly in accordance with the second embodiment of the invention.
Figure 4C:
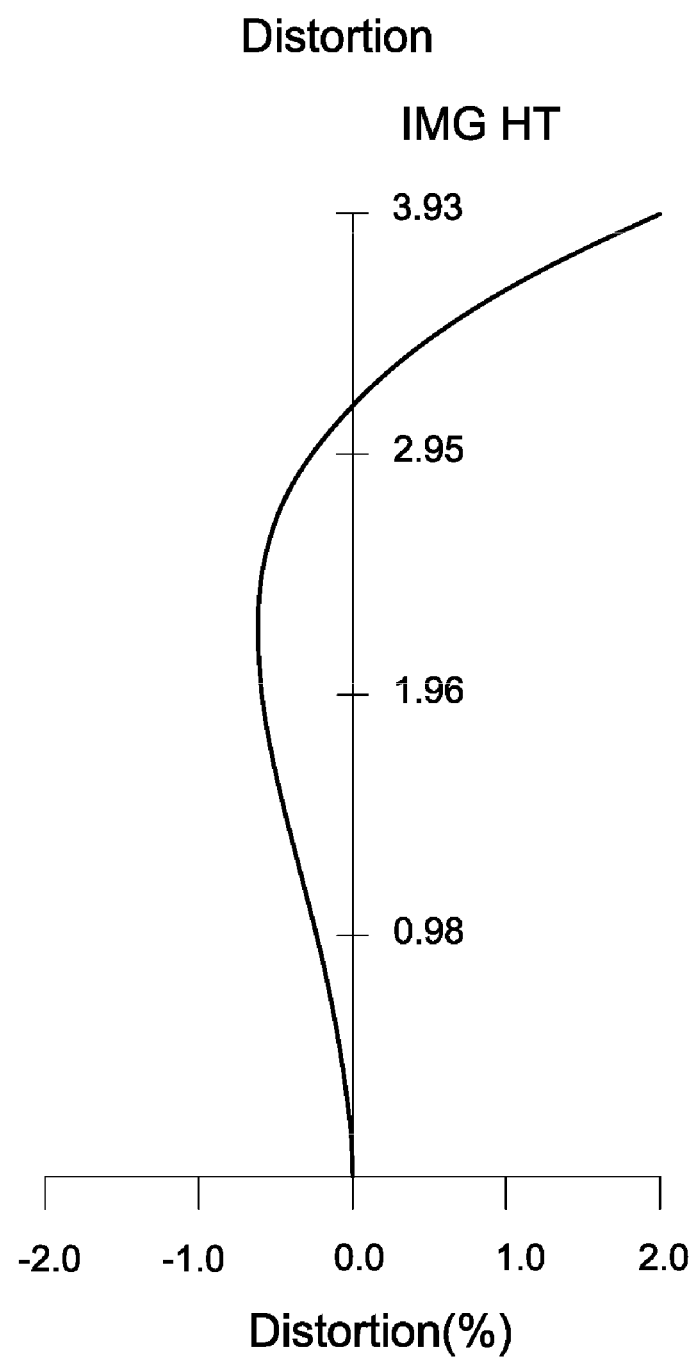
FIG. 4C is a distortion diagram of the wide-angle lens assembly in accordance with the second embodiment of the invention.

By the above arrangements of the lenses and stop ST2, the wide-angle lens assembly 2 of the second embodiment can meet the requirements of optical performance as seen in FIGS. 4A-4C, wherein FIG. 4A shows a longitudinal spherical aberration diagram of the wide-angle lens assembly 2 in accordance with the second embodiment of the invention, FIG. 4B shows an astigmatic field curves diagram of the wide-angle lens assembly 2 in accordance with the second embodiment of the invention, and FIG. 4C shows a distortion diagram of the wide-angle lens assembly 2 in accordance with the second embodiment of the invention.

It can be seen from FIG. 4A that the longitudinal spherical aberration in the wide-angle lens assembly 2 of the second embodiment ranges from −0.015 mm to 0.015 mm for the wavelength of 470.0000 nm, 555.0000 nm, and 650.0000 nm.

It can be seen from FIG. 4B that the astigmatic field curves of tangential direction and sagittal direction in the wide-angle lens assembly 2 of the second embodiment ranges from −0.020 mm to 0.020 mm for the wavelength of 555.0000 nm.

It can be seen from FIG. 4C that the distortion in the wide-angle lens assembly 2 of the second embodiment ranges from −1.0% to 2.0% for the wavelength of 555.0000 nm.

It is obvious that the longitudinal spherical aberration, the astigmatic field curves, and the distortion of the wide-angle lens assembly 2 of the second embodiment can be corrected effectively. Therefore, the wide-angle lens assembly 2 of the second embodiment is capable of good optical performance.

Figure 5:
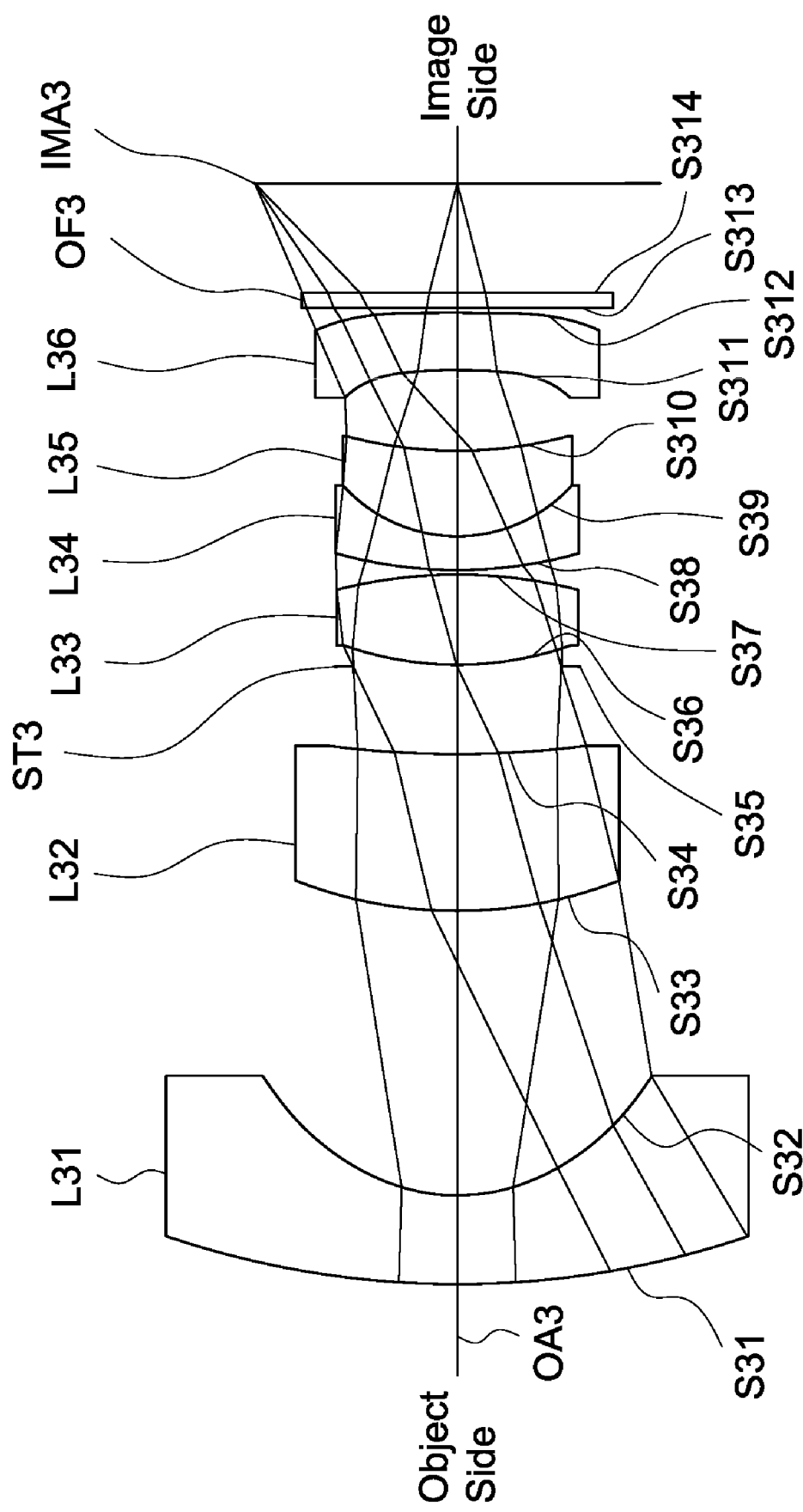
FIG. 5 is a lens layout and optical path diagram of a wide-angle lens assembly in accordance with a third embodiment of the invention.

Referring to FIG. 5, FIG. 5 is a lens layout and optical path diagram of a wide-angle lens assembly in accordance with a third embodiment of the invention. The wide-angle lens assembly 3 includes a first lens L31, a second lens L32, a stop ST3, a third lens L33, a fourth lens L34, a fifth lens L35, a sixth lens L36, and an optical filter OF3, all of which are arranged in order from an object side to an image side along an optical axis OA3. In operation, an image of light rays from the object side is formed at an image plane IMA3.

The first lens L31 is a meniscus lens with negative refractive power and made of glass material, wherein the object side surface S31 is a convex surface, the image side surface S32 is a concave surface, and both of the object side surface S31 and image side surface S32 are aspheric surfaces.

The second lens L32 is a meniscus lens with positive refractive power and made of glass material, wherein the object side surface S33 is a convex surface, the image side surface S34 is a concave surface, and both of the object side surface S33 and image side surface S34 are aspheric surfaces.

The third lens L33 is a biconvex lens with positive refractive power and made of glass material, wherein the object side surface S36 is a convex surface, the image side surface S37 is a convex surface, and both of the object side surface S36 and image side surface S37 are spherical surfaces.

The fourth lens L34 is a meniscus lens with negative refractive power and made of glass material, wherein the object side surface S38 is a convex surface, the image side surface S39 is a concave surface, and both of the object side surface S38 and image side surface S39 are spherical surfaces.

The fifth lens L35 is a meniscus lens with positive refractive power and made of glass material, wherein the object side surface S39 is a convex surface, the image side surface S310 is a concave surface, and both of the object side surface S39 and image side surface S310 are spherical surfaces.

The fourth lens L34 and the fifth lens L35 are cemented.

The sixth lens L36 is a biconcave lens with negative refractive power and made of glass material, wherein the object side surface S311 is a concave surface, the image side surface S312 is a concave surface, and both of the object side surface S311 and image side surface S312 are aspheric surfaces.

Both of the object side surface S313 and image side surface S314 of the optical filter OF3 are plane surfaces.

In order to maintain excellent optical performance of the wide-angle lens assembly in accordance with the third embodiment of the invention, the wide-angle lens assembly 3 satisfies at least one of the following conditions:

$$-70 \leq ((R3_{31}-R3_{32})/(R3_{31}+R3_{32})) \times ((R3_{41}-R3_{42})/(R3_{41}+R3_{42})) \times ((R3_{51}-R3_{52})/(R3_{51}+R3_{52})) \times ((R3_{61}-R3_{62})/(R3_{61}+R3_{62})) \leq -2.8 \quad (13)$$

$$4 < R3_{11}/R3_{12} \leq 100 \quad (14)$$

$$-100 \leq R3_{61}/R3_{62} < 0.1 \quad (15)$$

$$10 \leq Vd3_1/Nd3_1 \leq 32 \quad (16)$$

$$0.2 \leq f3/TTL3 \leq 1 \quad (17)$$

$$\leq f3_3/f3 \leq 2 \quad (18)$$

The definition of $R3_{11}$, $R3_{12}$, $R3_{31}$, $R3_{32}$, $R3_{41}$, $R3_{42}$, $R3_{51}$, $R3_{52}$, $R3_{61}$, $R3_{62}$, $Vd3_1$, $Nd3_1$, f3, $f3_3$, and TTL3 are the same as that of $R1_{11}$, $R1_{12}$, $R1_{31}$, $R1_{32}$, $R1_{41}$, $R1_{42}$, $R1_{51}$, $R1_{52}$, $R1_{61}$, $R1_{62}$, $Vd1_1$, $Nd1_1$, f1, $f1_3$, and TTL1 in the first embodiment, and is not described here again.

By the above design of the lenses, stop ST3, and satisfies at least one of the conditions (13)-(18), the wide-angle lens assembly 3 is provided with an effective shortened total lens length, an effective increased field of view, an effective increased resolution, an effective corrected aberration, and a resistance to environment temperature variation.

If the value $R3_{11}/R3_{12}$ of condition (14) is less than 4 then the ability to correct the aberration for the first lens L31 is decreased and the shape of the first lens L31 cannot be controlled effectively. Therefore, the value $R3_{11}/R3_{12}$ must be at least greater than 4. An optimal range for $R3_{11}/R3_{12}$ is greater than 4 and less than 100 or equal to 100. The lens assembly 3 accords with the optimal range, the shape of the first lens L31 can be controlled effectively, the strength of the refractive power of the first lens L31 can be restrained at the same time, and the ability for correcting the aberration of the first lens L31 can be strengthened.

In order to achieve the above purposes and effectively enhance the optical performance, the wide-angle lens assembly 3 in accordance with the third embodiment of the invention is provided with the optical specifications shown in Table 7, which include the effective focal length, F-number, total lens length, field of view, radius of curvature of each lens surface, thickness between adjacent surface, refractive index of each lens, and Abbe number of each lens. Table 7 shows that the effective focal length is equal to 4.715 mm, F-number is equal to 2.0, total lens length is equal to 23.501 mm, and field of view is equal to 78.209 degrees for the wide-angle lens assembly 3 of the third embodiment of the invention.

TABLE 7

Effective Focal Length = 4.715 mm F-number = 2.0
Total Lens Length = 23.501 mm Field of View = 78.209 Degrees

| Surface Number | Radius of Curvature (mm) | Thickness (mm) | Nd | Vd | Remark |
|---|---|---|---|---|---|
| S31 | 16.348 | 1.501 | 1.602 | 43.5 | The First Lens L31 |
| S32 | 3.282 | 9.372 | | | |
| S33 | 12.963 | 2.392 | 1.780 | 34.0 | The Second Lens L32 |
| S34 | 70.080 | 1.117 | | | |
| S35 | ∞ | 0.030 | | | Stop ST3 |
| S36 | 6.139 | 1.424 | 1.606 | 63.0 | The Third Lens L33 |
| S37 | −7.936 | 0.030 | | | |
| S38 | 13.969 | 1.171 | 1.847 | 23.8 | The Fourth Lens L34 |
| S39 | 3.474 | 1.641 | 1.729 | 54.7 | The Fifth Lens L35 |
| S310 | 14.126 | 1.320 | | | |
| S311 | −14.726 | 0.700 | 1.847 | 23.8 | The Sixth Lens L36 |
| S312 | 890.032 | 0.071 | | | |
| S313 | ∞ | 0.300 | 1.517 | 64.2 | Optical Filter OF3 |
| S314 | ∞ | 2.431 | | | |

The aspheric surface sag z of each lens in table 7 can be calculated by the following formula:

$$z = ch^2/\{1+[1-(k+1)c^2h^2]^{1/2}\} + Ah^4 + Bh^6 + Ch^8$$

where c is curvature, h is the vertical distance from the lens surface to the optical axis, k is conic constant and A, B and C are aspheric coefficients.

In the third embodiment, the conic constant k and the aspheric coefficients A, B, C of each surface are shown in Table 8.

TABLE 8

| | Surface Number | | | | | |
|---|---|---|---|---|---|---|
| | S31 | S32 | S33 | S34 | S311 | S312 |
| K | −2.7656E+01 | −4.5390E−01 | 1.4417E+00 | 0.0000E+00 | 0.0000E+00 | 0.0000E+00 |
| A | 1.8514E−04 | −7.2576E−04 | −9.7444E−04 | 4.0795E−04 | −1.0909E−02 | −4.5702E−03 |
| B | −1.4072E−06 | 2.9359E−05 | −4.5113E−06 | 5.4076E−05 | −2.7275E−04 | 9.7275E−05 |
| C | 9.8327E−08 | −1.1115E−06 | 5.0104E−06 | 4.5659E−05 | −4.6962E−05 | 3.2917E−05 |

Table 9 shows the parameters and condition values for conditions (13)-(18). As can be seen from Table 9, the wide-angle lens assembly 3 of the third embodiment satisfies the conditions (13)-(18).

TABLE 9

| $R3_{11}$ | 16.3483 mm | $R3_{12}$ | 3.2822 mm | $R3_{31}$ | 6.1388 mm |
|---|---|---|---|---|---|
| $R3_{32}$ | −7.9355 mm | $R3_{41}$ | 13.9692 mm | $R3_{42}$ | 3.4739 mm |
| $R3_{51}$ | 3.4739 mm | $R3_{52}$ | 14.1262 mm | $R3_{61}$ | −14.7265 mm |
| $R3_{62}$ | 890.0321 mm | $Vd3_1$ | 43.5 | $Nd3_1$ | 1.6020 |
| f3 | 4.715 mm | $f3_3$ | 6.7466 mm | TTL3 | 23.501 mm |
| $(R3_{31} − R3_{32})/(R3_{31} + R3_{32}) \times (R3_{41} − R3_{42})/(R3_{41} + R3_{42}) \times$ $(R3_{51} − R3_{52})/(R3_{51} + R3_{52}) \times (R3_{61} − R3_{62})/(R3_{61} + R3_{62})$ | | | | | −2.949 |
| $R3_{11}/R3_{12}$ | 4.981 | $R3_{61}/R3_{62}$ | −0.017 | $Vd3_1/Nd3_1$ | 27.142 |
| f3/TTL3 | 0.201 | $f3_3/f3$ | 1.431 | | |

Figure 6A:
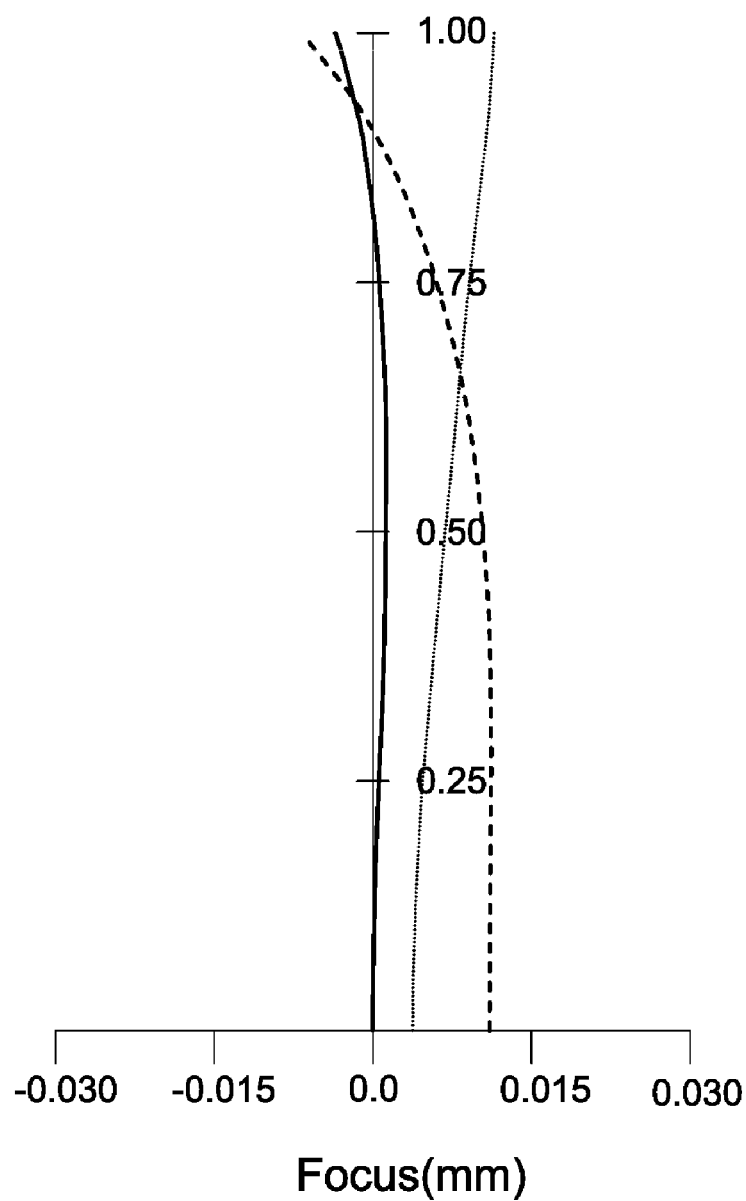
FIG. 6A depicts a longitudinal spherical aberration of the wide-angle lens assembly in accordance with the third embodiment of the invention.
Figure 6B:
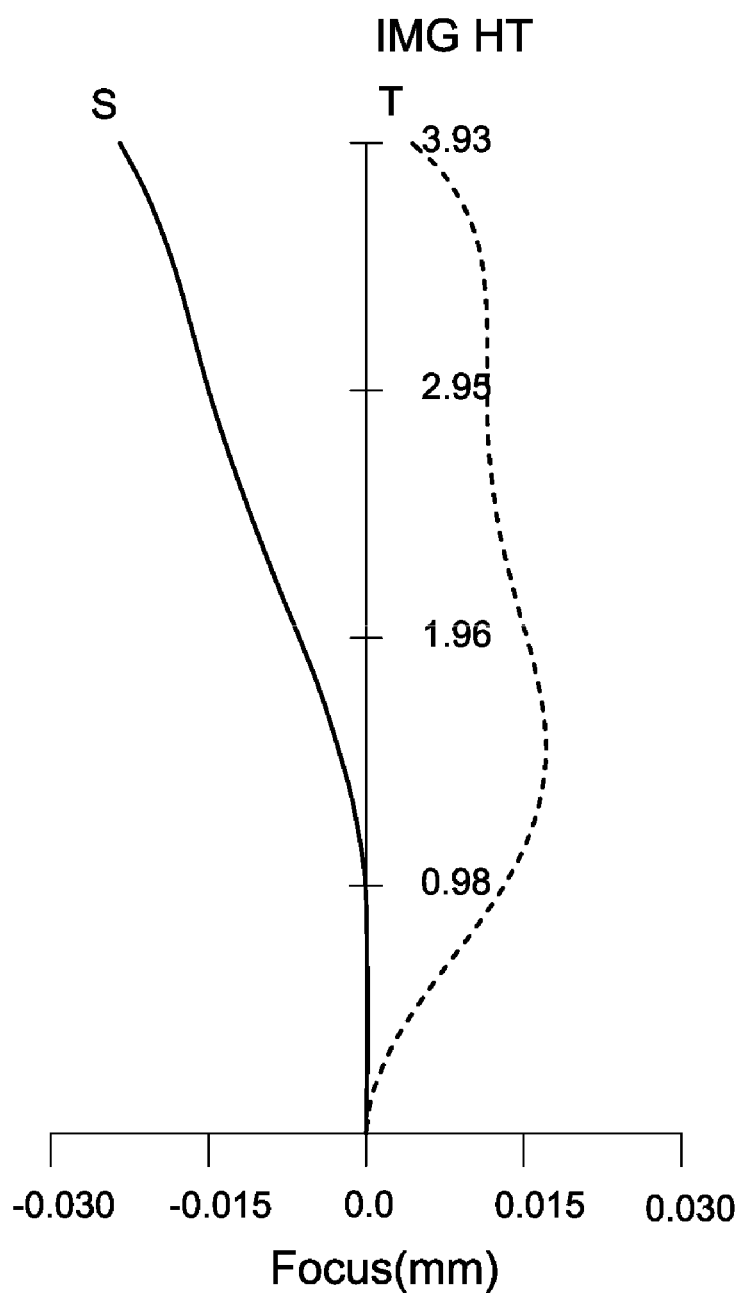
FIG. 6B is an astigmatic field curves diagram of the wide-angle lens assembly in accordance with the third embodiment of the invention.
Figure 6C:
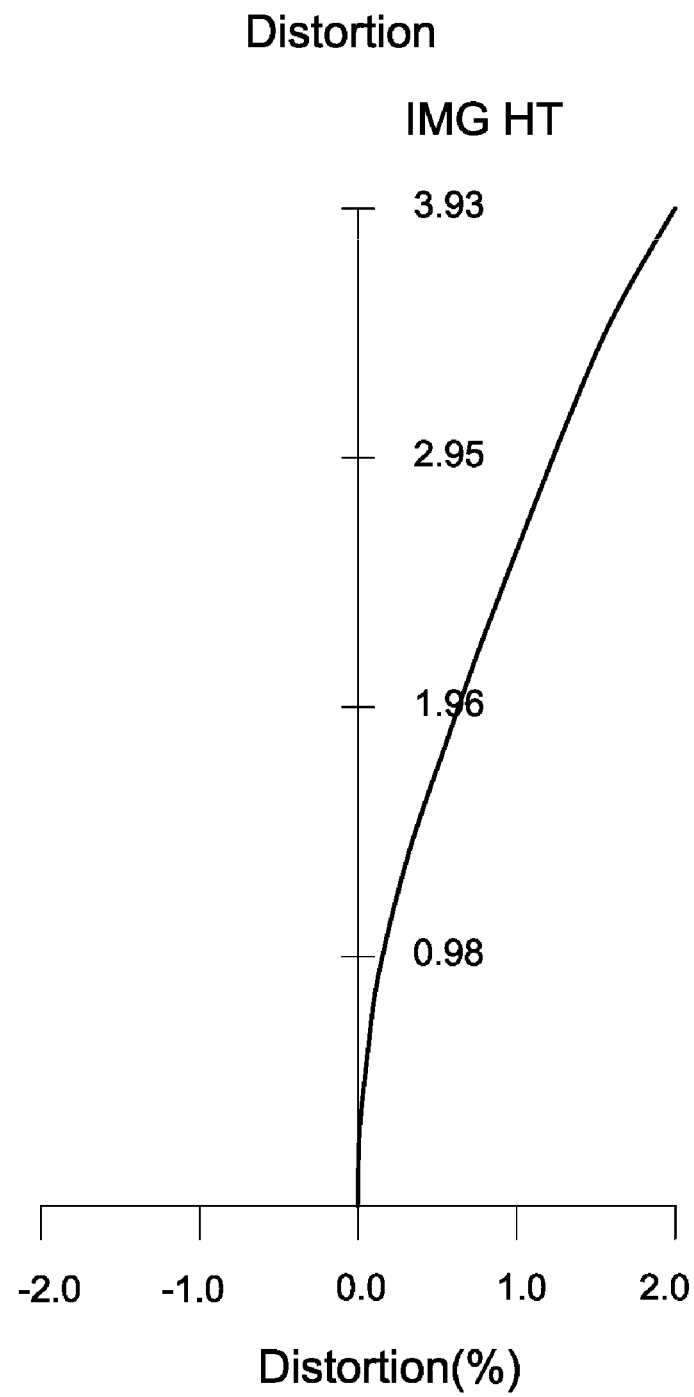
FIG. 6C is a distortion diagram of the wide-angle lens assembly in accordance with the third embodiment of the invention.

By the above arrangements of the lenses and stop ST3, the wide-angle lens assembly 3 of the third embodiment can meet the requirements of optical performance as seen in FIGS. 6A-6C, wherein FIG. 6A shows a longitudinal spherical aberration diagram of the wide-angle lens assembly 3 in accordance with the third embodiment of the invention, FIG. 6B shows an astigmatic field curves diagram of the wide-angle lens assembly 3 in accordance with the third embodiment of the invention, and FIG. 6C shows a distortion diagram of the wide-angle lens assembly 3 in accordance with the third embodiment of the invention.

It can be seen from FIG. 6A that the longitudinal spherical aberration in the wide-angle lens assembly 3 of the third embodiment ranges from −0.015 mm to 0.015 mm for the wavelength of 470.0000 nm, 555.0000 nm, and 650.0000 nm.

It can be seen from FIG. 6B that the astigmatic field curves of tangential direction and sagittal direction in the wide-angle lens assembly 3 of the third embodiment ranges from −0.030 mm to 0.030 mm for the wavelength of 555.0000 nm.

It can be seen from FIG. 6C that the distortion in the wide-angle lens assembly 3 of the third embodiment ranges from 0% to 2.0% for the wavelength of 555.0000 nm.

It is obvious that the longitudinal spherical aberration, the astigmatic field curves, and the distortion of the wide-angle lens assembly 3 of the third embodiment can be corrected effectively. Therefore, the wide-angle lens assembly 3 of the third embodiment is capable of good optical performance.

Figure 7:
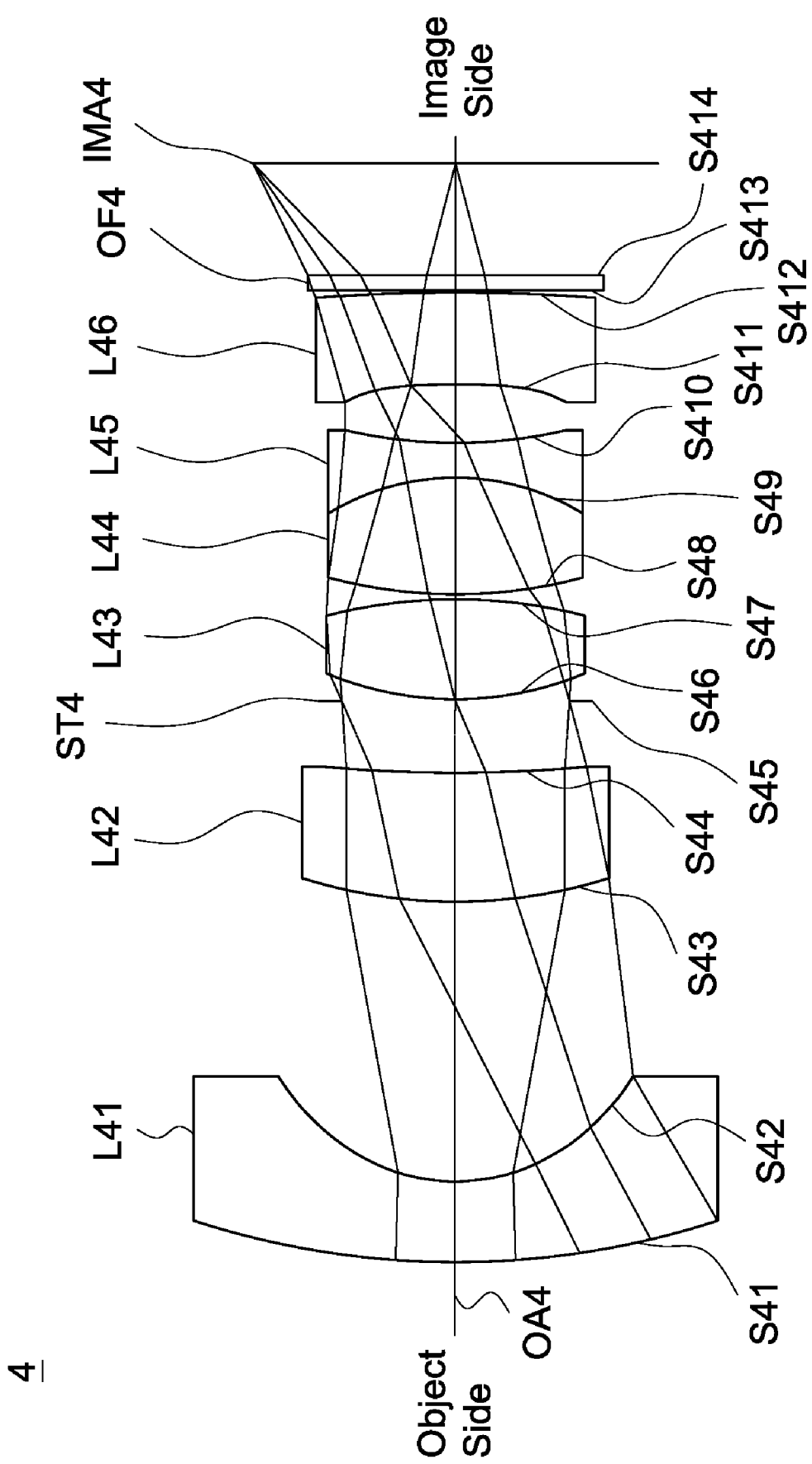
FIG. 7 is a lens layout and optical path diagram of a wide-angle lens assembly in accordance with a fourth embodiment of the invention.

Referring to FIG. 7, FIG. 7 is a lens layout and optical path diagram of a wide-angle lens assembly in accordance with a fourth embodiment of the invention. The wide-angle lens assembly 4 includes a first lens L41, a second lens L42, a stop ST4, a third lens L43, a fourth lens L44, a fifth lens L45, a sixth lens L46, and an optical filter OF4, all of which are arranged in order from an object side to an image side along an optical axis OA4. In operation, an image of light rays from the object side is formed at an image plane IMA4.

The first lens L41 is a meniscus lens with negative refractive power and made of glass material, wherein the object side surface S41 is a convex surface, the image side surface S42 is a concave surface, and both of the object side surface S41 and image side surface S42 are aspheric surfaces.

The second lens L42 is a meniscus lens with positive refractive power and made of glass material, wherein the object side surface S43 is a convex surface, the image side surface S44 is a concave surface, and both of the object side surface S43 and image side surface S44 are aspheric surfaces.

The third lens L43 is a biconvex lens with positive refractive power and made of glass material, wherein the object side surface S46 is a convex surface, the image side surface S47 is a convex surface, and both of the object side surface S46 and image side surface S47 are spherical surfaces.

The fourth lens L44 is a biconvex lens with positive refractive power and made of glass material, wherein the object side surface S48 is a convex surface, the image side surface S49 is a convex surface, and both of the object side surface S48 and image side surface S49 are spherical surfaces.

The fifth lens L45 is a biconcave lens with negative refractive power and made of glass material, wherein the object side surface S49 is a concave surface, the image side surface S410 is a concave surface, and both of the object side surface S49 and image side surface S410 are spherical surfaces.

The fourth lens L44 and the fifth lens L45 are cemented.

The sixth lens L46 is a meniscus lens with negative refractive power and made of glass material, wherein the object side surface S411 is a concave surface, the image side surface S412 is a convex surface, and both of the object side surface S411 and image side surface S412 are aspheric surfaces.

Both of the object side surface S413 and image side surface S414 of the optical filter OF4 are plane surfaces.

In order to maintain excellent optical performance of the wide-angle lens assembly in accordance with the fourth embodiment of the invention, the wide-angle lens assembly 4 satisfies at least one of the following conditions:

$$-70 \leq ((R4_{31}-R4_{32})/(R4_{31}+R4_{32})) \times ((R4_{41}-R4_{42})/(R4_{41}+R4_{42})) \times ((R4_{51}-R4_{52})/(R4_{51}+R4_{52})) \times ((R4_{61}-R4_{62})/(R4_{61}+R4_{62})) \leq -2.8 \quad (19)$$

$$4 < R4_{11}/R4_{12} \leq 100 \quad (20)$$

$$-100 \leq R4_{61}/R4_{62} < 0.1 \quad (21)$$

$$10 \leq Vd4_1/Nd4_1 \leq 32 \quad (22)$$

$$0.2 \leq f4/TTL4 \leq 1 \quad (23)$$

$$1 \leq f4_3/f4 \leq 2 \quad (24)$$

The definition of $R4_{11}$, $R4_{12}$, $R4_{31}$, $R4_{32}$, $R4_{41}$, $R4_{42}$, $R4_{51}$, $R4_{52}$, $R4_{61}$, $R4_{62}$, $Vd4_1$, $Nd4_1$, f4, $f4_3$, and TTL4 are the same as that of $R1_{11}$, $R1_{12}$, $R1_{31}$, $R1_{32}$, $R1_{41}$, $R1_{42}$, $R1_{51}$, $R1_{52}$, $R1_{61}$, $R1_{62}$, $Vd1_1$, $Nd1_1$, f1, $f1_3$, and TTL1 in the first embodiment, and is not described here again.

By the above design of the lenses, stop ST4, and satisfies at least one of the conditions (19)-(24), the wide-angle lens assembly 4 is provided with an effective shortened total lens length, an effective increased field of view, an effective increased resolution, an effective corrected aberration, and a resistance to environment temperature variation.

If the value $R4_{61}/R4_{62}$ of condition (21) is greater than 0.1 then the ability to correct the aberration for the sixth lens L46 is decreased and the shape of the sixth lens L46 cannot be controlled effectively. Therefore, the value $R4_{61}/R4_{62}$ must be at least less than 0.1. An optimal range for $R4_{61}/R4_{62}$ is greater than −100 or equal to −100 and less than 0.1. The lens assembly 4 accords with the optimal range, the shape of the sixth lens L46 can be controlled effectively, the strength of the refractive power of the sixth lens L46 can be restrained at the same time, and the ability for correcting the aberration of the sixth lens L46 can be strengthened.

In order to achieve the above purposes and effectively enhance the optical performance, the wide-angle lens assembly 4 in accordance with the fourth embodiment of the invention is provided with the optical specifications shown in Table 10, which include the effective focal length, F-number, total lens length, field of view, radius of curvature of each lens surface, thickness between adjacent surface, refractive index of each lens, and Abbe number of each lens. Table 10 shows that the effective focal length is equal to 4.795 mm, F-number is equal to 2.0, total lens length is equal to 22.000 mm, and field of view is equal to 77.278 degrees for the wide-angle lens assembly 4 of the fourth embodiment of the invention.

TABLE 10

Effective Focal Length = 4.795 mm F-number = 2.0
Total Lens Length = 22.000 mm Field of View = 77.278 Degrees

| Surface Number | Radius of Curvature (mm) | Thickness (mm) | Nd | Vd | Remark |
|---|---|---|---|---|---|
| S41 | 16.099 | 1.599 | 1.681 | 41.6 | The First Lens L41 |
| S42 | 3.677 | 5.612 | | | |
| S43 | 9.659 | 2.593 | 1.751 | 33.7 | The Second Lens L42 |
| S44 | 37.734 | 1.425 | | | |
| S45 | ∞ | 0.040 | | | Stop ST4 |
| S46 | 6.660 | 2.001 | 1.629 | 61.1 | The Third Lens L43 |
| S47 | −10.241 | 0.100 | | | |
| S48 | 9.693 | 2.336 | 1.720 | 55.1 | The Fourth Lens L44 |

TABLE 10-continued

Effective Focal Length = 4.795 mm F-number = 2.0
Total Lens Length = 22.000 mm Field of View = 77.278 Degrees

| Surface Number | Radius of Curvature (mm) | Thickness (mm) | Nd | Vd | Remark |
|---|---|---|---|---|---|
| S49 | −4.864 | 0.700 | 1.837 | 24.6 | The Fifth Lens L45 |
| S410 | 9.683 | 1.172 | | | |
| S411 | −21.409 | 1.842 | 1.847 | 23.8 | The Sixth Lens L46 |
| S412 | −479.299 | 0.040 | | | |
| S413 | ∞ | 0.300 | 1.517 | 64.2 | Optical Filter OF4 |
| S414 | ∞ | 2.240 | | | |

The aspheric surface sag z of each lens in table 10 can be calculated by the following formula:

$$z = ch^2/\{1+[1-(k+1)c^2h^2]^{1/2}\} + Ah^4 + Bh^6 + Ch^8$$

where c is curvature, h is the vertical distance from the lens surface to the optical axis, k is conic constant and A, B and C are aspheric coefficients.

In the fourth embodiment, the conic constant k and the aspheric coefficients A, B, C of each surface are shown in Table 11.

TABLE 11

| | Surface Number | | | | | |
|---|---|---|---|---|---|---|
| | S41 | S42 | S43 | S44 | S411 | S412 |
| K | −1.6296E+01 | −3.9183E−01 | 2.5843E+00 | 0.0000E+00 | 0.0000E+00 | 0.0000E+00 |
| A | 2.6916E−04 | 3.2308E−05 | −7.3636E−04 | 1.7718E−04 | −8.4874E−03 | −3.0252E−03 |
| B | −1.4466E−06 | 1.7400E−05 | −5.0558E−06 | 1.9460E−05 | −3.0420E−04 | 8.2233E−05 |
| C | −2.0399E−08 | 1.0665E−06 | −1.0964E−06 | 1.9028E−05 | −1.5622E−04 | 1.1921E−05 |

Table 12 shows the parameters and condition values for conditions (19)-(24). As can be seen from Table 12, the wide-angle lens assembly 4 of the fourth embodiment satisfies the conditions (19)-(24).

TABLE 12

| $R4_{11}$ | 16.0944 mm | $R4_{12}$ | 3.6769 mm | $R4_{31}$ | 6.6604 mm |
|---|---|---|---|---|---|
| $R4_{32}$ | −10.2408 mm | $R4_{41}$ | 9.6933 mm | $R4_{42}$ | −4.8641 mm |
| $R4_{51}$ | −4.8641 mm | $R4_{52}$ | 9.6826 mm | $R4_{61}$ | −21.4086 mm |
| $R4_{62}$ | −479.2988 mm | $Vd4_1$ | 41.6 | $Nd4_1$ | 1.681 |
| f4 | 4.795 mm | $f4_3$ | 6.7065 mm | TTL4 | 22.000 mm |
| $(R4_{31} - R4_{32})/(R4_{31} + R4_{32}) \times (R4_{41} - R4_{42})/(R4_{41} + R4_{42}) \times$ | | | | | −39.284 |
| $(R4_{51} - R4_{52})/(R4_{51} + R4_{52}) \times (R_{61} - R4_{62})/(R4_{61} + R4_{62})$ | | | | | |
| $R4_{11}/R4_{12}$ | 4.379 | $R4_{61}/R4_{62}$ | 0.045 | $Vd4_1/Nd4_1$ | 24.768 |
| f4/TTL4 | 0.218 | $f4_3/f4$ | 1.399 | | |

Figure 8A:
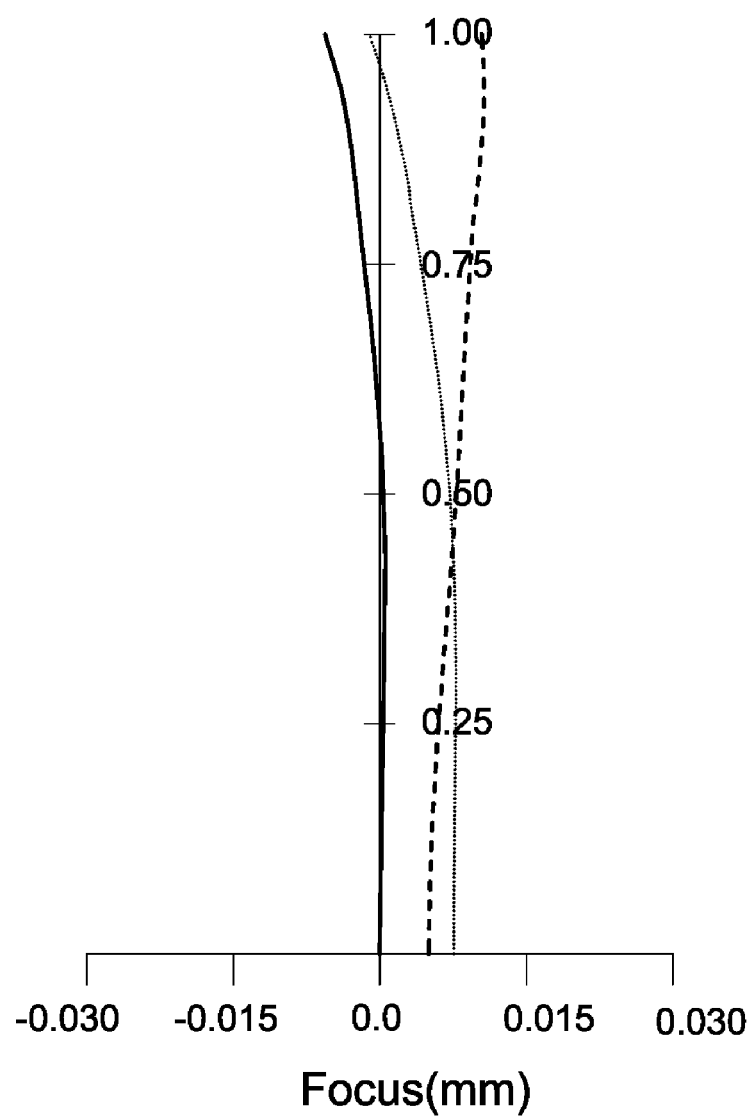
FIG. 8A depicts a longitudinal spherical aberration of the wide-angle lens assembly in accordance with the fourth embodiment of the invention.
Figure 8B:
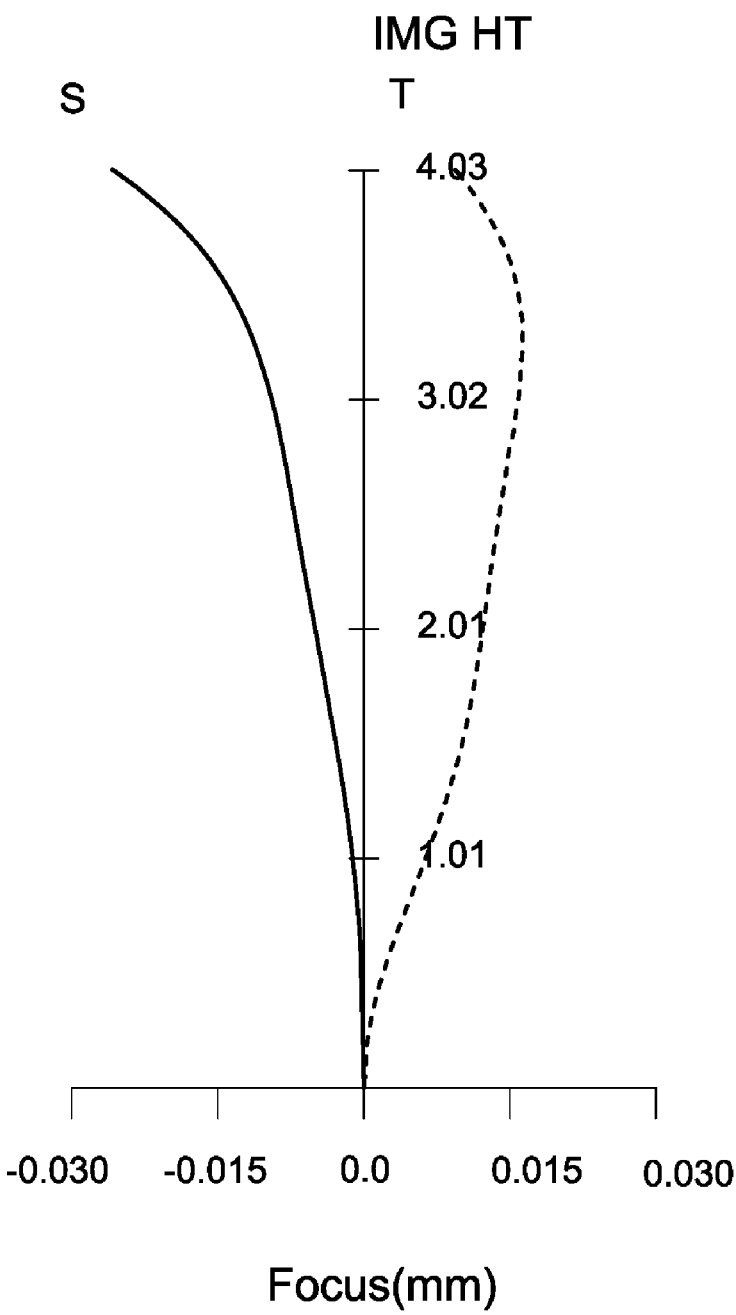
FIG. 8B is an astigmatic field curves diagram of the wide-angle lens assembly in accordance with the fourth embodiment of the invention.
Figure 8C:
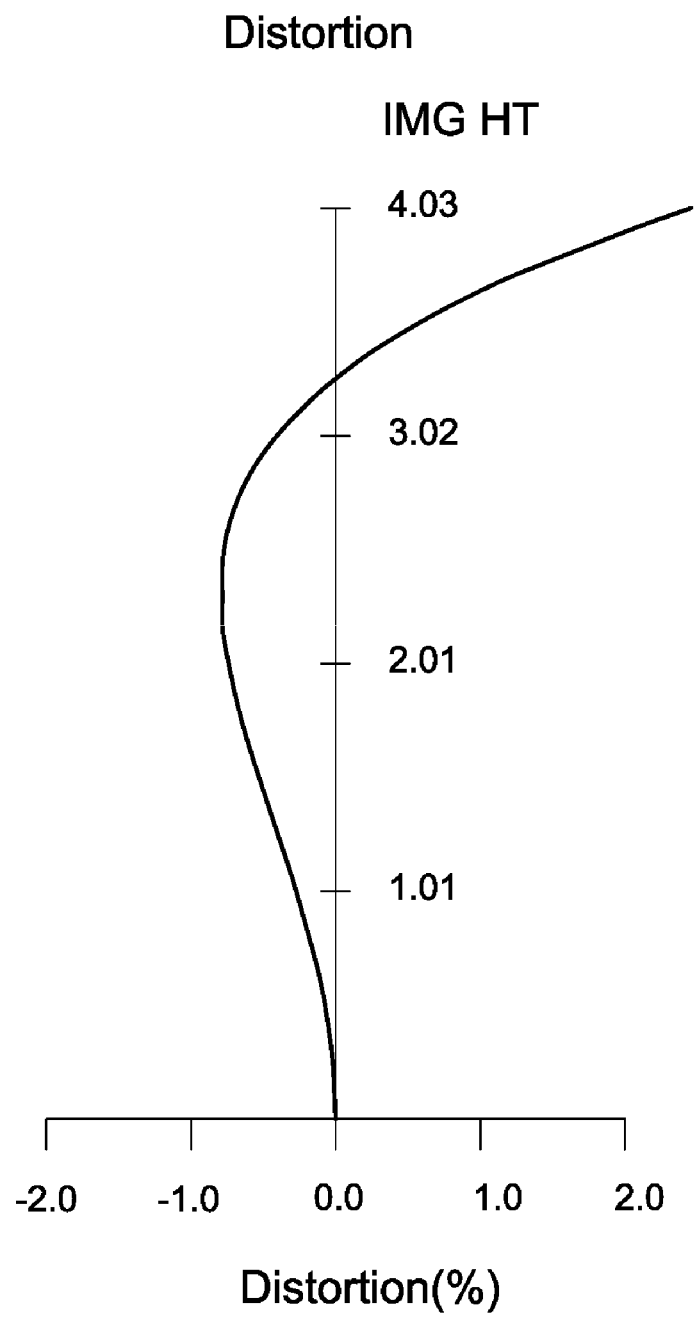
FIG. 8C is a distortion diagram of the wide-angle lens assembly in accordance with the fourth embodiment of the invention.

By the above arrangements of the lenses and stop ST4, the wide-angle lens assembly 4 of the fourth embodiment can meet the requirements of optical performance as seen in FIGS. 8A-8C, wherein FIG. 8A shows a longitudinal spherical aberration diagram of the wide-angle lens assembly 8 in accordance with the fourth embodiment of the invention, FIG. 8B shows an astigmatic field curves diagram of the wide-angle lens assembly 4 in accordance with the fourth embodiment of the invention, and FIG. 8C shows a distortion diagram of the wide-angle lens assembly 4 in accordance with the fourth embodiment of the invention.

It can be seen from FIG. 8A that the longitudinal spherical aberration in the wide-angle lens assembly 4 of the fourth embodiment ranges from −0.015 mm to 0.015 mm for the wavelength of 470.0000 nm, 555.0000 nm, and 650.0000 nm.

It can be seen from FIG. 8B that the astigmatic field curves of tangential direction and sagittal direction in the wide-angle lens assembly 4 of the fourth embodiment ranges from −0.030 mm to 0.030 mm for the wavelength of 555.0000 nm.

It can be seen from FIG. 8C that the distortion in the wide-angle lens assembly 4 of the fourth embodiment ranges from −1.0% to 2.5% for the wavelength of 555.0000 nm.

It is obvious that the longitudinal spherical aberration, the astigmatic field curves, and the distortion of the wide-angle lens assembly 4 of the fourth embodiment can be corrected effectively. Therefore, the wide-angle lens assembly 4 of the fourth embodiment is capable of good optical performance.

The main conditions for the present invention are $0.2 \leq f/TTL \leq 1$, $1 \leq f_3/f \leq 2$, $4 < R_{11}/R_{12} \leq 100$ and $-100 \leq R_{61}/R_{62} < 0.1$. The condition values of the embodiments for the present invention also fall within the range of the remaining conditions. The condition: $1 \leq f_3/f \leq 2$ benefits to a better balance between optical performance and manufacturability of the lens assembly. The condition: $0.2 \leq f/TTL \leq 1$ benefits to achieve miniaturization. The condition: $4 < R_{11}/R_{12} \leq 100$ benefits to the shape control for the first lens, restraining the strength of the refractive power of the first lens at the same time, and strengthening the ability for correcting the aberration of the first lens. The condition: $-100 \leq R_{61}/R_{62} < 0.1$ benefits to the shape control for the sixth lens, restraining the strength of the refractive power of the sixth lens at the same time, and strengthening the ability for correcting the aberration of the sixth lens.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly, in sequence from an object side to an image side along an optical axis, comprising:
    a first lens which is a meniscus lens with negative refractive power;
    a second lens which is a meniscus lens with positive refractive power;
    a third lens which is a biconvex lens with positive refractive power;
    a fourth lens which is with refractive power and comprises a convex surface facing the object side;
    a fifth lens which is with refractive power and comprises a concave surface facing the image side; and
    a sixth lens which is with negative refractive power and comprises a concave surface facing the object side;
    wherein the wide-angle lens assembly satisfies:

$-70 \leq ((R_{31}-R_{32})/(R_{31}+R_{32})) \times ((R_{41}-R_{42})/(R_{41}+R_{42})) \times ((R_{51}-R_{52})/(R_{51}+R_{52})) \times ((R_{61}-R_{62})/(R_{61}+R_{62})) \leq -2.8$, wherein $R_{31}$ is a radius of curvature of an object side surface of the third lens, $R_{32}$ is a radius of curvature of an image side surface of the third lens, $R_{41}$ is a radius of curvature of the convex surface of the fourth lens, $R_{42}$ is a radius of curvature of an image side surface of the fourth lens, $R_{51}$ is a radius of curvature of an object side surface of the fifth lens, $R_{52}$ is a radius of curvature of the concave surface of the fifth lens, $R_{61}$ is a radius of curvature of the concave surface of the sixth lens, and $R_{62}$ is a radius of curvature of an image side surface of the sixth lens.

2. The wide-angle lens assembly as claimed in claim 1, further comprising a stop disposed between the second lens and the third lens.

3. The wide-angle lens assembly as claimed in claim 2, wherein the fourth lens and the fifth lens are cemented.

4. The wide-angle lens assembly as claimed in claim 3, wherein the wide-angle lens assembly satisfies:

$0.2 \leq f/TTL \leq 1$, wherein f is an effective focal length of the wide-angle lens assembly and TTL is an interval from an object side surface of the first lens to an image plane along the optical axis.

5. The wide-angle lens assembly as claimed in claim 4, wherein the fourth lens is with negative refractive power and further comprises a concave surface facing the image side.

6. The wide-angle lens assembly as claimed in claim 5, wherein the fifth lens is with positive refractive power and further comprises a convex surface facing the object side.

7. The wide-angle lens assembly as claimed in claim 3, wherein the fourth lens is with positive refractive power and further comprises a convex surface facing the image side.

8. The wide-angle lens assembly as claimed in claim 7, wherein the fifth lens is with negative refractive power and further comprises a concave surface facing the object side.

9. The wide-angle lens assembly as claimed in claim 3, wherein the wide-angle lens assembly satisfies:

$1 \leq f_3 \leq 2$, wherein $f_3$ is an effective focal length of the third lens and f is an effective focal length of the wide-angle lens assembly.

10. The wide-angle lens assembly as claimed in claim 1, wherein the wide-angle lens assembly satisfies:

$4 < R_{11}/R_{12} \leq 100$, wherein $R_{11}$ is a radius of curvature of an object side surface of the first lens and $R_{12}$ is a radius of curvature of an image side surface of the first lens.

11. The wide-angle lens assembly as claimed in claim 10, wherein the wide-angle lens assembly satisfies:

$10 \leq Vd_1/Nd_1 \leq 32$, wherein $Vd_1$ is an Abbe number of the first lens and $Nd_1$ is an index of refraction of the first lens.

12. The wide-angle lens assembly as claimed in claim 1, wherein the wide-angle lens assembly satisfies:

$-100 \leq R_{61}/R_{62} < 0.1$, wherein $R_{61}$ is a radius of curvature of the concave surface of the sixth lens and $R_{62}$ is a radius of curvature of an image side surface of the sixth lens.

13. The wide-angle lens assembly as claimed in claim 12, wherein the sixth lens further comprises a convex surface facing the image side.

14. The wide-angle lens assembly as claimed in claim 12, wherein the sixth lens further comprises a concave surface facing the image side.

15. The wide-angle lens assembly as claimed in claim 1, wherein the wide-angle lens assembly satisfies:

$1 \leq f_3/f \leq 2$, wherein $f_3$ is an effective focal length of the third lens and f is an effective focal length of the wide-angle lens assembly.

16. The wide-angle lens assembly as claimed in claim 1, the first lens further comprising a convex surface facing the object side and a concave surface facing the image side.

17. The wide-angle lens assembly as claimed in claim 1, the second lens further comprising a convex surface facing the object side and a concave surface facing the image side.

18. A wide-angle lens assembly, in sequence from an object side to an image side along an optical axis, comprising:
- a first lens which is a meniscus lens with negative refractive power;
- a second lens which is a meniscus lens with positive refractive power;
- a third lens which is a biconvex lens with positive refractive power;
- a fourth lens which is with refractive power and comprises a convex surface facing the object side;
- a fifth lens which is with refractive power and comprises a concave surface facing the image side; and
- a sixth lens which is with negative refractive power and comprises a concave surface facing the object side;

wherein the wide-angle lens assembly satisfies:

$$10 \leq Vd_1/Nd_1 \leq 32,$$

wherein $Vd_1$ is an Abbe number of the first lens and $Nd_1$ is an index of refraction of the first lens.

19. A wide-angle lens assembly, in sequence from an object side to an image side along an optical axis, comprising:
- a first lens which is a meniscus lens with negative refractive power;
- a second lens which is a meniscus lens with positive refractive power;
- a third lens which is a biconvex lens with positive refractive power;
- a fourth lens which is with refractive power and comprises a convex surface facing the object side;
- a fifth lens which is with refractive power and comprises a concave surface facing the image side; and
- a sixth lens which is with negative refractive power and comprises a concave surface facing the object side and a convex surface facing the image side.

* * * * *